(12) United States Patent
Kaskari et al.

(10) Patent No.: US 9,792,900 B1
(45) Date of Patent: Oct. 17, 2017

(54) GENERATION OF PHONEME-EXPERTS FOR SPEECH RECOGNITION

(71) Applicant: Malaspina Labs (Barbados), Inc., Vancouver (CA)

(72) Inventors: Saeed Mosayyebpour Kaskari, Irvine, CA (US); Aanchan Kumar Mohan, Vancouver (CA); Michael David Fry, Richmond (CA); Dean Wolfgang Neumann, Maple Ridge (CA)

(73) Assignee: MALASPINA LABS (BARBADOS), INC., St. Michael (BB)

( * ) Notice: Subject to any disclaimer, the term of this patent is extended or adjusted under 35 U.S.C. 154(b) by 0 days.

(21) Appl. No.: 15/203,761

(22) Filed: Jul. 6, 2016

Related U.S. Application Data

(60) Provisional application No. 62/322,163, filed on Apr. 13, 2016.

(51) Int. Cl.
| | | |
|---|---|---|
| *G10L 15/16* | (2006.01) | |
| *G10L 15/06* | (2013.01) | |
| *G10L 15/02* | (2006.01) | |

(52) U.S. Cl.
CPC ............ *G10L 15/063* (2013.01); *G10L 15/02* (2013.01); *G10L 15/16* (2013.01); *G10L 2015/025* (2013.01); *G10L 2015/0635* (2013.01)

(58) Field of Classification Search
USPC .................................................. 704/231–257
See application file for complete search history.

(56) References Cited

U.S. PATENT DOCUMENTS

| | | | | |
|---|---|---|---|---|
| 2010/0057452 A1* | 3/2010 | Mukerjee | ................ | G10L 15/16 704/232 |
| 2010/0217589 A1* | 8/2010 | Gruhn | ................... | G10L 15/063 704/232 |
| 2014/0365221 A1* | 12/2014 | Ben-Ezra | .............. | G10L 15/142 704/256.1 |

OTHER PUBLICATIONS

Graves, et al., "Connectionist Temporal Classification: Labelling Unsegmented Sequence Data with Recurrent Neural Networks", Proceedings of the 23 rd International Conference on Machine Learning, 2006, 8 pages.

(Continued)

*Primary Examiner* — Abul Azad
(74) *Attorney, Agent, or Firm* — Ronald S. Fernando

(57) ABSTRACT

Various implementations disclosed herein include an expert-assisted phoneme recognition neural network system configured to recognize phonemes within continuous large vocabulary speech sequences without using language specific models ("left-context"), look-ahead ("right-context") information, or multi-pass sequence processing, and while operating within the resource constraints of low-power and real-time devices. To these ends, in various implementations, an expert-assisted phoneme recognition neural network system as described herein utilizes a-priori phonetic knowledge. Phonetics is concerned with the configuration of the human vocal tract while speaking and acoustic consequences on vocalizations. While similar sounding phonemes are difficult to detect and are frequently misidentified by previously known neural networks, phonetic knowledge gives insight into what aspects of sound acoustics contain the strongest contrast between similar sounding phonemes. Utilizing features that emphasize the respective second formants allows for more robust sound discrimination between these problematic phonemes.

15 Claims, 11 Drawing Sheets

(56) References Cited

OTHER PUBLICATIONS

Chung, et al., "Gated Feedback Recurrent Neural Networks", Jun. 17, 2015, 9 pages.
Chung, et al., "Empirical Evaluation of Gated Recurrent Neural Networks on Sequence Modeling", Dec. 11, 2014, 9 pages.
Cho, et al., "Learning Phrase Representations using RNN Encoder-Decoder for Statistical Machine Translation", Proceedings of the 2014 Conference on Empirical Methods in Natural Language Processing (EMNLP), pp. 1724-1734, Oct. 25-29, 2014.
Jozefowicz, et al., "An Empirical Exploration of Recurrent Network Architectures", Proceedings of the 32nd International Conference on Machine Learning, 2015, vol. 37, 9 pages.
Graves, et al., "Framewise Phoneme Classification with Bidirectional LSTM and Other Neural Network Architectures", IJCNN 2005 conference proceedings, 8 pages.
Graves, "Generating Sequences With Recurrent Neural Networks", Jun. 5, 2014, 43 pages.

\* cited by examiner

GENERATION OF PHONEME-EXPERTS FOR SPEECH RECOGNITION

TECHNICAL FIELD

The present disclosure relates to audible signal processing, and in particular, to accurately recognizing phonemes in noisy audible signal data using neural network systems.

BACKGROUND

The ability to recognize speech of a particular speaker is a basic human auditory system function. However, this function is notoriously difficult to reproduce using previously known machine-listening technologies because spoken communication often occurs in adverse acoustic environments. The problem is also complicated because how a person speaks the same words often varies between different utterances. Nevertheless, the unimpaired human auditory system is able to recognize speech effectively and perceptually instantaneously.

As a previously known machine-listening process, speech recognition (and subsequent re-synthesis) often includes recognizing phonemes using statistical formalisms such as neural networks. Phonemes are a basic representation of information bearing vocalizations. However, the previously known neural network approaches have a number of drawbacks. First, for example, in order to improve performance, previously known neural network approaches are heavily dependent on language-specific models, which make such approaches language-dependent. Second, many of the previously known neural network approaches recognize phonemes too slowly for real-time and/or low-latency applications because they are reliant on look-ahead information in order to provide context. Third, previously known neural network approaches are becoming increasingly computationally complex, use ever-larger memory allocations, and yet remain functionally limited and highly inaccurate—especially for problematic phonemes that are difficult to detect and are frequently misidentified as other similar sounding phonemes.

Due to increasing computational complexity and memory demands, previously known phoneme recognition neural network approaches are characterized by long delays and high power consumption. As such, these approaches are undesirable for low-power, real-time and/or low-latency devices, such as hearing aids and mobile devices (e.g., smartphones, wearables, etc.).

SUMMARY

Various implementations of systems, methods and devices within the scope of the appended claims each have several aspects, no single one of which is solely responsible for the attributes described herein. After considering this disclosure those of ordinary skill in the art will understand how the aspects of various implementations are used to enable expert-assisted phoneme recognition neural network systems configured to recognize phonemes within continuous large vocabulary speech sequences without using language specific models ("left-context"), look-ahead ("right-context") information, or multi-pass sequence processing, and while operating within the resource constraints of low-power and real-time devices.

In accordance with various implementations, a method of training an expert-assisted phoneme recognition neural network system, the method comprising: at an expert-assisted phoneme recognition neural network system configured to generate one or more phoneme candidates as recognized within audible signal data, the expert-assisted phoneme recognition neural network system including an ensemble phoneme recognition neural network and a phoneme-specific experts system: selecting a target problematic phoneme; synthesizing a targeted training data set including an overemphasis of examples of the target problematic phoneme; synthesizing respective problematic phoneme-specific weight values for problematic phoneme-specific expert neural network (PPENN) included in the phoneme-specific experts system by providing the synthesized target training data set to the PPENN in accordance with a determination that the respective problematic phoneme-specific weight values satisfy an error convergence threshold.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
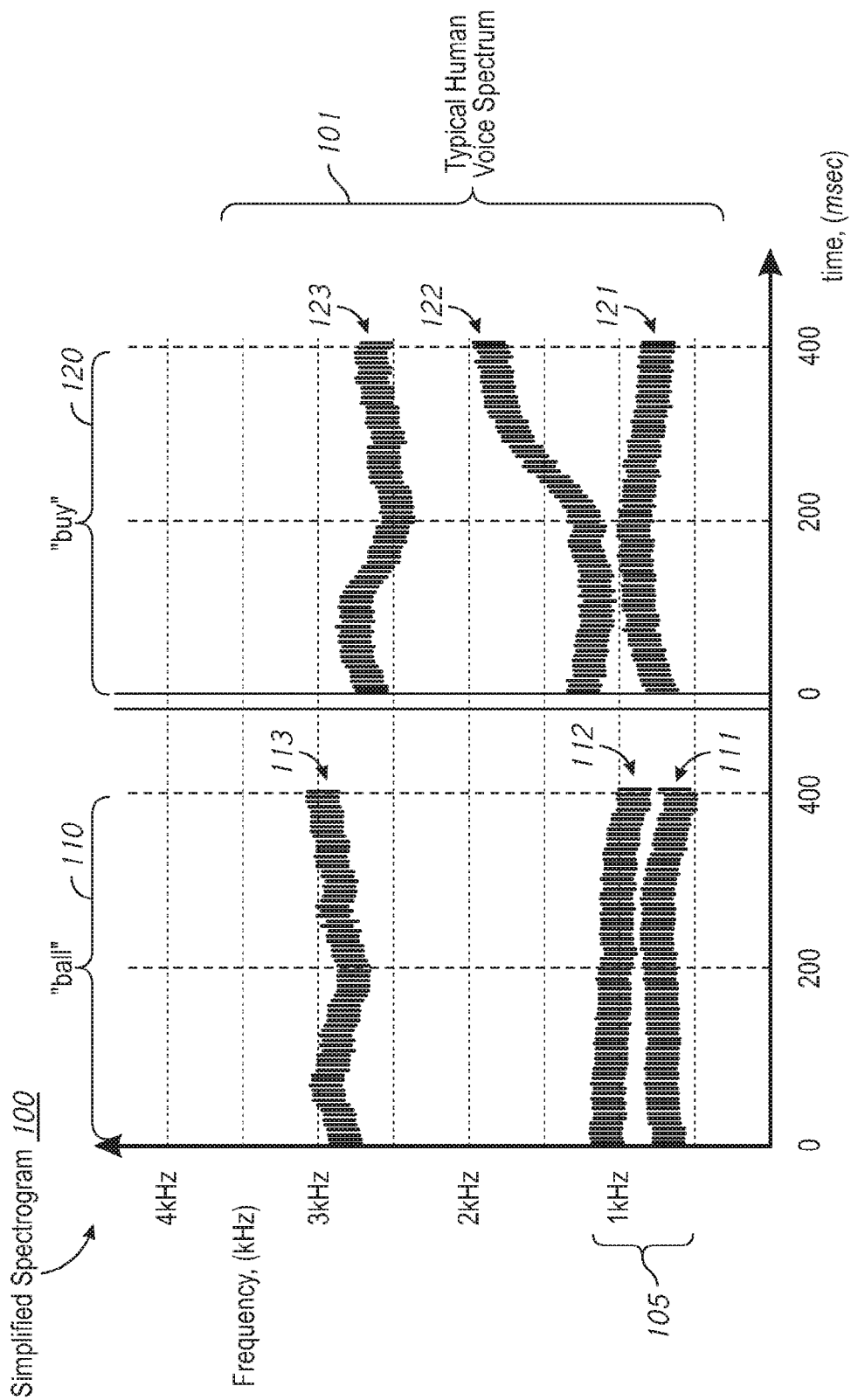
FIG. 1 is a simplified spectrogram of an example of vocalizations of two words having similar and potentially conflicting phonemes.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the drawings.

DETAILED DESCRIPTION

Numerous details are described herein in order to provide a thorough understanding of the example implementations illustrated in the accompanying drawings. However, the invention may be practiced without many of the specific details. Those of ordinary skill in the art will appreciate from the present disclosure that well-known methods, components, systems and circuits have not been described in exhaustive detail so as not to unnecessarily obscure more pertinent aspects of the implementations described herein.

As noted above, accurate speech recognition is a notoriously difficult hearing task to reproduce using previously known machine-listening technologies. The challenge is complicated because spoken communication often occurs in adverse acoustic environments, which often include ambient noise, interfering sounds, and background chatter. The problem is also complicated because how a person speaks the same words often varies between different utterances of the words. However, it is well established that speech recognition accuracy is highly dependent on phoneme recognition and discrimination accuracy, which varies greatly depending on the specific phonemes. For example, distinguishing the spoken word "first" from the spoken word "third" depends upon being able to distinguish an sound from a 'th' sound, and a 't' sound from a 'd' sound. But making such distinctions reliably using previously available machine-listening technologies is very difficult to accomplish.

As an example provided to illustrate the spectral challenges involved in distinguishing similar sounding phonemes, FIG. 1 is a simplified spectrogram 100 showing example formant sets 110, 120 associated with two words, namely, "ball" and "buy". Those of ordinary skill in the art will appreciate that the simplified spectrogram 100 includes merely the basic information typically available in a spectrogram. So while some specific features are illustrated, those of ordinary skill in the art will appreciate from the present disclosure that various features have not been illustrated for the sake of brevity and so as not to obscure more pertinent aspects of the spectrogram 100. Nevertheless, those of ordinary skill in the art would appreciate that the spectrogram 100 does include enough information to illustrate the pertinent differences between the two sets of formants 110, 120.

The spectrogram 100 includes the portion of the frequency spectrum associated with human vocalizations, the human voice spectrum 101. The human voice spectrum typically ranges from approximately 300 Hz to 3400 Hz. However, the bandwidth associated with a typical voice channel is approximately 4000 Hz (4 kHz) for telephone applications and 8000 Hz (8 kHz) for hearing aid applications.

Formants are distinguishing frequency components of voiced sounds that make up phonemes. A phoneme, of any language, includes a combination of formants in the human voice spectrum 101. In addition to characteristics such as pitch and amplitude (i.e., loudness), formants and how formants vary in time characterize how words are perceived to sound. Formants do not vary significantly in response to changes in pitch. However, formants do vary substantially in response to different vowel sounds. An example of the variation can be seen with reference to the formant sets 110, 120 for the words "ball" and "buy." The first formant set 110 for the word "ball" includes three dominant formants 111, 112 and 113. Similarly, the second formant set 120 for the word "buy" also includes three dominant formants 121, 122 and 123. The three dominant formants 111, 112 and 113 associated with the word "ball" are spaced differently and vary differently in time as compared to the three dominant formants 121, 122 and 123 associated with the word "buy." Also, if the formant sets 110 and 120 are attributable to different speakers, the formants sets would not be synchronized to the same fundamental frequency defining the pitch of one of the speakers.

As a previously known machine-listening process, speech recognition (and subsequent re-synthesis) typically includes phoneme recognition using neural networks, as phonemes are a constituent component of information bearing vocalizations that are perceived as spoken words. However, previously known neural network approaches have a number of drawbacks that make them undesirable for low-power, real-time and/or low-latency devices, such as hearing aids and mobile devices (e.g., smartphones, wearables, etc.).

First, previously known neural network approaches are heavily dependent on language specific models. Language specific models include distributions of conditional probability values characterizing the likelihoods of which phonemes follow other phonemes on a phoneme-by-phoneme basis. In other words, these models provide sequence information (or "left-context") to assist in the recognition of a phoneme at a given instance based on a decision recognizing a previous phoneme in sequence. While beneficial for improving recognition accuracy, relying on sequence information makes such approaches language-dependent. In turn, a speech recognition system relying on sequence information is limited to the number of language models that can be supported by the computational and memory resources of a given system. Generally, this is undesirable for devices, such as hearing aids and mobile devices, which are tightly resource constrained.

Second, many of the previously known neural network approaches process audible sequences far too slowly for real-time and/or low-latency applications because they are also reliant look-ahead information and multi-pass sequence processing. Look-ahead systems, or "right-context" information systems, delay the recognition of a phoneme until the system is able to evaluate which of one or more phonemes follow in sequence. Delaying phoneme recognition in this manner precludes real-time and/or low-latency operation because phoneme recognition depends on future phonemes.

Third, in order to improve recognition accuracy, previously known neural network approaches are becoming increasingly computationally complex, are demanding ever larger memory allocations, and yet remain functionally limited and highly inaccurate—especially for problematic phonemes that are difficult to detect and are frequently misidentified as other similar sounding phonemes. For example, some previously known neural network approaches employ a structured neural network architecture that is configured toward recognizing different individual phonemes. What these approaches have in common is that they merely rely on low-level linguistic information present in an audio signal as inputs, and force the structured neural network to learn to recognize the higher order attributes of speech (e.g., auditory filters that emulate the response of the basilar membrane in the human ear) that focus on identifying sound energies in different frequency bands, combinations of different auditory filter energies, the evolution of filter responses over time, combining these features to track "high energy" plosive sounds versus "harmonic" vowel sounds a-posteriori. Relying on a neural network to learn to recognize higher order attributes of speech from audible signal data significantly increases the size and complexity of the neural network required. For example, a previously available recurrent neural network (RNN) with the capacity to learn to recognize higher order attributes of speech typically includes nine to ten hidden layers in addition to the input and output layers that define the RNN. A RNN of that size typically includes inputs sizes of the order of $10^3$, a number of neurons (neural network logic units) of the order of $10^4$, interconnects (between the logic units) of the order of $10^6$, and noisy speech training data of the order of $10^4$ hours. As noted above, despite this immense computational complexity and demand for memory, these approaches remain functionally limited especially for problematic phonemes.

By contrast, various implementations disclosed herein include an expert-assisted phoneme recognition neural network system configured to recognize phonemes within continuous large vocabulary speech sequences without using language specific models ("left-context"), look-ahead ("right-context") information, or multi-pass sequence processing, and while operating within the resource constraints of low-power and real-time devices. To these ends, in various implementations, an expert-assisted phoneme recognition neural network system as described herein utilizes a-priori phonetic knowledge. Phonetics is concerned with the configuration of the human vocal tract while speaking and acoustic consequences on vocalizations. While similar sounding phonemes are difficult to detect and are frequently misidentified by previously known neural networks, phonetic knowledge gives insight into what aspects of sound acoustics contain the strongest contrast between similar sounding phonemes. For example, two vowels that are articulated with similar tongue height (e.g., 'ih' and 'uh') will have similar first formants, which make it difficult to distinguish between them. However, the same vowels are also articulated with differing degrees of tongue backness (tongue backness is a characterization of the position of the tongue during the articulation of a vowel relative to the back of the mouth), resulting in different second formants. Utilizing features that emphasize the respective second formants thus allows for more robust sound discrimination between these problematic phonemes. Since human vocal tracts are similar for human speakers of all languages, focus on features such as those above are beneficial for sound discrimination in all languages.

Figure 2A:
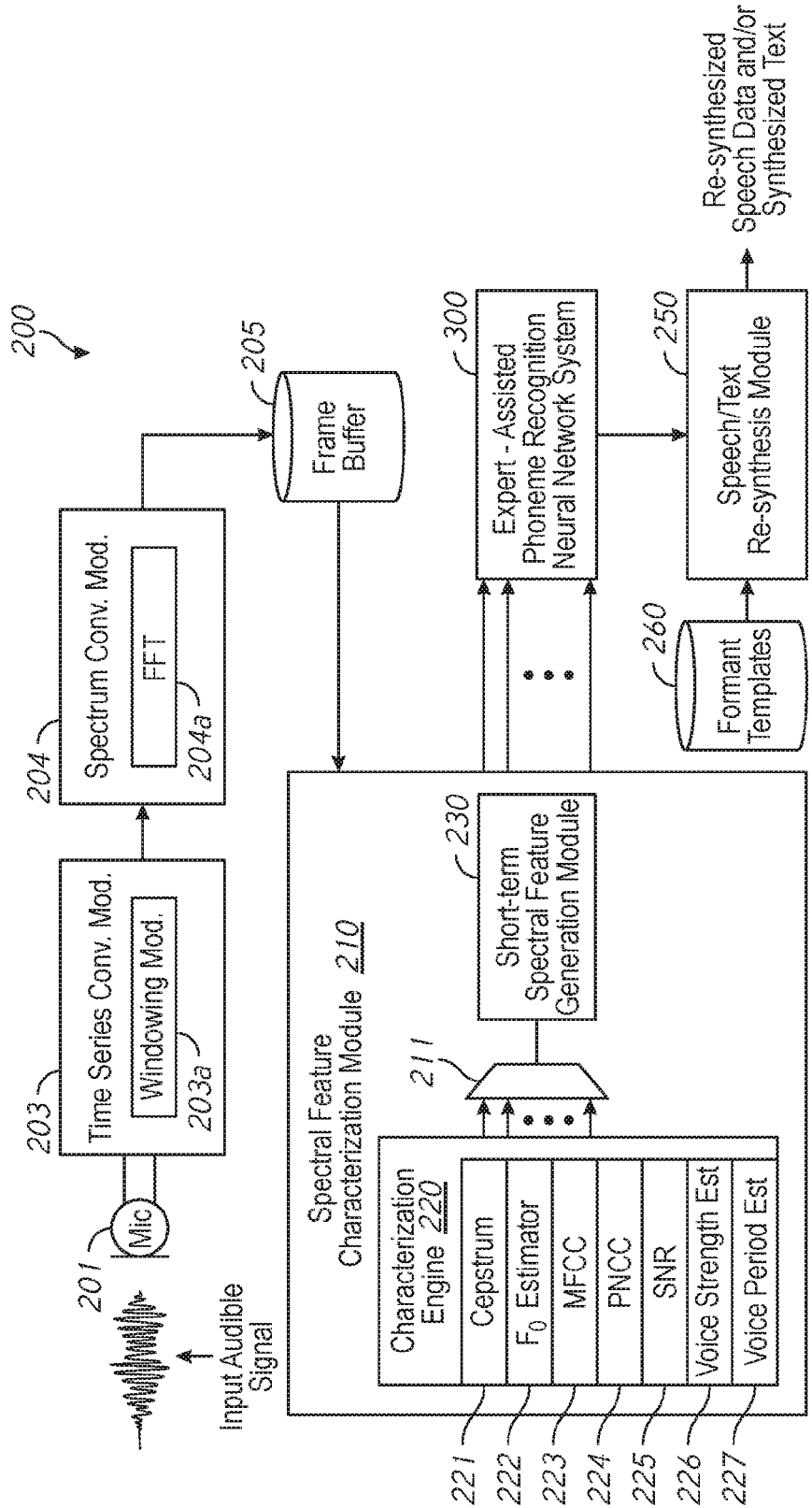
FIG. 2A is a block diagram of a speech recognition and re-synthesis system incorporating an expert-assisted phoneme recognition neural network system in accordance with some implementations.

FIG. 2A is a block diagram of a speech recognition and re-synthesis system 200 incorporating an expert-assisted phoneme recognition neural network system 300 in accordance with some implementations. In various implementations, the speech recognition and re-synthesis system 200 or portions thereof are included in a device or system enabled with one or more machine-listening applications, such as a computer, a laptop computer, a tablet device, a mobile phone, a smartphone, a wearable (e.g., a smart watch), a gaming device, and a hearing aid. While pertinent features are illustrated, those of ordinary skill in the art will appreciate from the present disclosure that various other features have not been illustrated for the sake of brevity and so as not to obscure more pertinent aspects of the implementations disclosed herein. Those of ordinary skill in the art will also appreciate from the present disclosure that the functions of the modules described below can be combined into one or more modules and/or further sub-divided into additional sub-modules; and, that the modules described below are provided as merely one example configuration of the various aspects and functions described herein.

As a non-limiting example, in some implementations, the speech recognition and re-synthesis system 200 includes a microphone 201, a time series conversion module 203, a spectrum conversion module 204, a frame buffer 205, a spectral feature characterization module 210, the aforementioned expert-assisted phoneme recognition neural network system 300, a speech (or text) re-synthesis module 250, and a formant templates buffer 260.

The microphone 201 (e.g., one or more audio sensors) is provided to receive and convert sound into electronic signal data that can be stored in a non-transitory memory, and which is referred to as audible signal data hereinafter. In many situations, audible signal data is captured from within an adverse acoustic environment, and thus likely includes ambient noise, interfering sounds, and background chatter in addition to a target voice of interest.

In many applications, the microphone 201 provides the audible signal data as an ongoing or continuous time series of values. In turn, the times series conversion module 203 is configured to generate two or more temporal frames of audible signal data from a continuous stream of audible signal data. Each temporal frame of audible signal data includes a temporal portion of the audible signal received by the microphone 201. In some implementations, the times series conversion module 203 includes a windowing module 203a that is configured to mark and separate one or more temporal frames or portions of the audible signal data for times $t_1, t_2, \ldots, t_n$. In some implementations, each temporal frame of the audible signal data is conditioned by a pre-filter (not shown). For example, in some implementations, pre-filtering includes band-pass filtering to isolate and/or emphasize the portion of the frequency spectrum typically associated with human speech. In some implementations, pre-filtering includes pre-emphasizing portions of one or more temporal frames of the audible signal data in order to adjust the spectral composition of the one or more temporal frames of the audible signal data. Additionally and/or alternatively, in some implementations, the windowing module 203a is configured to retrieve the audible signal data from a non-transitory memory. Additionally and/or alternatively, in some implementations, pre-filtering includes filtering the received audible signal using a low-noise amplifier (LNA) in order to substantially set a noise floor for further processing. In some implementations, a pre-filtering LNA is arranged between the microphone 201 and the time series conversion module 203. Those of ordinary skill in the art will appreciate that numerous other pre-filtering techniques may be applied to the received audible signal, and those highlighted herein are merely examples of numerous pre-filtering options available.

The spectrum conversion module 204 operates to generate a corresponding frequency domain representation for each of the one or more temporal frames, so that one or more spectral characteristics of the audible signal data can be determined for each frame. In some implementations, the frequency domain representation of a temporal frame includes at least one of a plurality of sub-bands contiguously distributed throughout the frequency spectrum associated with voiced sounds. In some implementations, for example, the spectrum conversion module 204 includes a Fast Fourier Transform (FFT) sub-module 204a. In some implementations, a 32 point short-time FFT is used for conversion into the frequency domain. Those of ordinary skill in the art will appreciate that any number of FFT implementations are used in various implementations. In various implementations, the FFT module 204a may also be replaced with a Goertzel module. Additionally and/or alternatively, the FFT module 204a may also be replaced with any suitable implementation of a wavelet decomposition module, constant-Q transform and/or a set of redundant basis function modules configured to capture pertinent spectral characteristics of the input signal. In some implementations, an optional spectral filter module (not shown) is configured to receive and adjust the spectral composition of the frequency domain representations of the one or more frames. In some implementations, for example, the spectral filter module is configured to one of emphasize, deemphasize, and/or isolate one or more spectral components of a temporal frame of the audible signal in the frequency domain. The frequency domain representations of the one or more frames are stored in the frame buffer 205, which is accessible to the spectral feature characterization module 210.

The spectral feature characterization module 210 is configured to generate a plurality of feature streams from the frequency domain representations of the one or more frames of audible signal data. In various implementations, the plurality of feature streams generated by the spectral feature characterization module 210 includes a first feature stream ($F_1$) that is suitable for an ensemble phoneme recognition neural network, which is included in the expert-assisted phoneme recognition neural network system 300. Additionally, in some implementations, the plurality of feature streams generated includes one or more targeted feature streams ($F_2$ to $F_n$). As described below, each problematic phoneme feature stream is provided to a corresponding problematic phoneme-specific expert neural network that supports the operation of the ensemble phoneme recognition neural network.

In various implementations, the spectral feature characterization module 210 includes a characterization engine 220, a multiplexer (MUX) 211 (or selection module), and short-term spectral feature generation module 230. In various implementations, each of the plurality of feature streams ($F_1$, $F_2$ to $F_n$) includes any of a number and/or combination of signal processing features, such as mel-scaled cepstral coefficients, power normalized cepstral coefficients, linguistically informed spectral moments, frequency-domain linear prediction, group-delay function, a pitch estimation, a signal-to-noise ratio (SNR), a voice strength estimate, and a voice period variance estimate.

For example, in various implementations, the characterization engine 220 includes one or more sub-modules that are configured to analyze the frames in order to obtain feature characterization data. As shown in FIG. 2, the feature characterization module 220 includes a cepstrum analysis sub-module 221, a fundamental frequency ($f_0$) estimation sub-module 222, a mel-frequency cepstrum coefficients analysis sub-module 223, a power normalized cepstral coefficients analysis sub-module 224, a SNR estimation sub-module 225, a voice strength estimation sub-module 226, and a voice period variance estimation sub-module 227. Those of ordinary skill in the art will appreciate from the present disclosure that the functions of the aforementioned sub-modules can be combined into one or more sub-modules and/or further sub-divided into additional sub-modules; and, that the aforementioned sub-modules are provided as merely one example configuration of the various features described herein.

In some implementations, the cepstrum analysis sub-module 221 is configured to determine the Inverse Fourier Transform (IFT) of the logarithm of a frequency domain representation of a temporal frame. In some implementations, the fundamental frequency ($f_0$) estimation sub-module 222 is configured to provide a pitch estimate of voice activity in an audible signal. As known to those of ordinary skill in the art, pitch is generally an estimation of a dominant frequency characterizing a corresponding series of glottal pulses associated with voiced sounds. As such, the pitch estimation sub-module 222 is configured to identify the presence of regularly spaced transients generally corresponding to glottal pulses characteristic of voiced speech. In some implementations, relative amplitude and relative spacing identify the transients. In some implementations, the mel-frequency cepstrum coefficients (MFCCs) analysis sub-module 223 is configured to provide a representation of the short-term power spectrum of a frequency domain representation of a temporal frame. During MFCC processing, the logarithm is determined after passing the power spectrum through a mel-filter bank. The mel-filter bank includes a bank of triangular filters, the centers of which are at locations on the mel-scale (typically linear up to 1000 Hz and logarithmic thereafter). In some implementations, the power normalized cepstrum coefficients (PNCCs) analysis sub-module 224 is configured to provide another representation of the short-term power spectrum of a frequency domain representation of a temporal frame. The process for generating PNCCs is similar to that for generating MFCCs with a few modifications. First, a gammatone filter bank is used instead of triangular filter bank. Second, filter bank energies are filtered to remove noise and reverberation effects. Third, power law nonlinearity together with power normalization instead of a logarithm as is done in MFCC feature extraction is applied. In some implementations, linguistically informed spectral moments are calculated, providing a general description of the spectral shape of a time frame. In some implementations, Group-Delay functions are calculated using both the magnitude and phase spectra of a time frame. The two spectra are combined using multiples of themselves and an alpha and gamma parameter. In some implementations, the SNR estimation sub-module 225 is configured to estimate the signal-to-noise ratio in one or more of the frequency domain representations of the temporal frames. In some implementations, the voice strength estimation sub-module 226 is configured to provide an indicator of the relative strength of the target or dominant voice signal in a frame. In some implementations, the relative strength is measured by the number of detected glottal pulses, which are weighted by respective correlation coefficients. In some implementations, the relative strength indicator includes the highest detected amplitude of the smoothed inter-peak interval accumulation produced by an accumulator function. In some implementations, the voice period variance estimation sub-module 227 is configured to estimate the pitch variance in one or more of the frequency domain representations of the temporal frames. In other words, the voice period variance estimation sub-module 227 provides an indicator for each sub-band that indicates how far the period detected in a sub-band is from the dominant voice period P. In some implementations the variance indicator for a particular sub-band is determined by keeping track of a period estimate derived from the glottal pulses detected in that particular sub-band, and comparing the respective pitch estimate with the dominant voice period P.

In operation, the short-term spectral feature generation module 230 utilizes the MUX 211 in order to selectively activate the sub-modules of the characterization engine 220 for the generation of the plurality of feature streams ($F_1$, $F_2$ to $F_n$). In some implementations, the sub-modules that are selected are determined during the training of the network. This determination may be done using a multiple linear regression, which estimates the variance explained for a phoneme expert in a given generated feature stream. In other implementations, feature streams are selected based on a determination of linguistically relevant information for identifying a phoneme. The plurality of feature streams ($F_1$, $F_2$ to $F_n$) are provided to the expert-assisted phoneme recognition neural network system 300, which is described in greater detail with reference to FIG. 3. The speech (or text) re-synthesis module 250 is configured to use the output of the expert-assisted phoneme recognition neural network system 300 in combination with the formant templates (stored in buffer 260) in order to re-synthesize an audible speech signal (or a text translation) of the audible signal data received by the microphone 201.

Figure 2B:
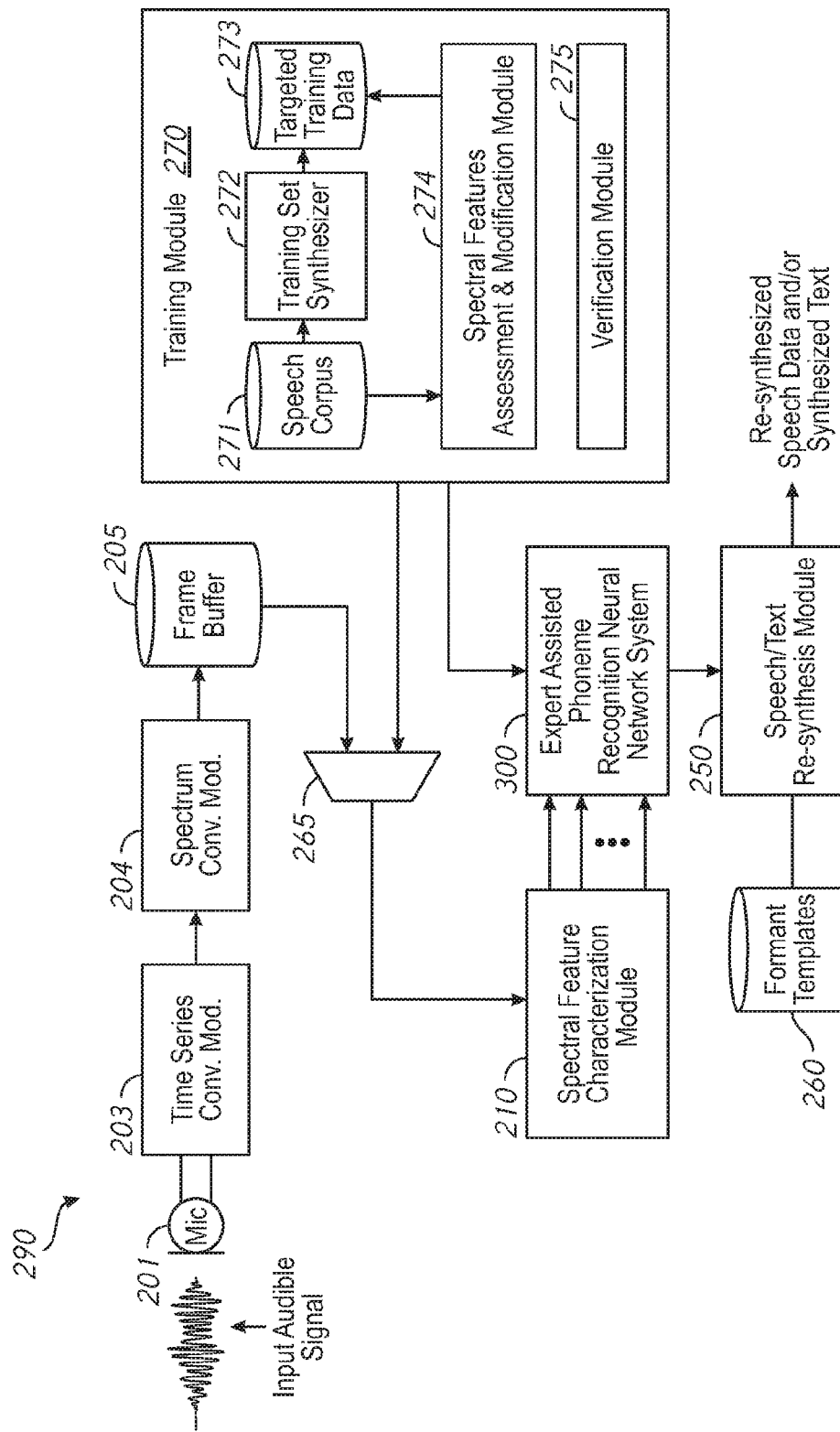
FIG. 2B is a block diagram of a speech recognition and re-synthesis system incorporating an expert-assisted phoneme recognition neural network system and a training module in accordance with some implementations.

FIG. 2B is a block diagram of a speech recognition and re-synthesis system 290 incorporating the expert-assisted phoneme recognition neural network system 300 and a training module 270 in accordance with some implementations. The system 290 illustrated in FIG. 2B is similar to and adapted from the system 200 illustrated in FIG. 2A. Accordingly, elements common to FIGS. 2A and 2B include common reference numbers, and only the differences between FIGS. 2A and 2B are described herein for the sake of brevity. Again, while pertinent features are illustrated, those of ordinary skill in the art will appreciate from the present disclosure that various other features have not been illustrated for the sake of brevity and so as not to obscure more pertinent aspects of the implementations disclosed herein. Those of ordinary skill in the art will also appreciate from the present disclosure that the functions of the modules described below can be combined into one or more modules and/or further sub-divided into additional sub-modules; and, that the modules described below are provided as merely one example configuration of the various aspects and functions described herein.

As a non-limiting example, as compared to the system 200, the system 290 additionally includes the training module 270 and a mode-selection MUX 265. In some implementations, the mode-selection MUX 265 is used to coordinate switching between training modes and detection modes, which are described below with reference to FIGS. 6 and 8. In detection mode, the mode-selection MUX 265 is used to couple the frame buffer 205 to the spectral feature characterization module 210, as described above with reference to FIG. 2A. In training mode, the mode-selection MUX 265 is used to couple the training module 270 to the spectral feature characterization module 210. In some implementations, operation of the mode-selection MUX 265 is managed by a system controller (not shown) or operating system (See FIG. 9). In some implementations, the training module 270 is provided separately.

As shown in FIG. 2B, in various implementations, the training module 270 includes a speech corpus buffer 271, a training set synthesizer 272, a targeted training data buffer 273, a spectral features assessment and modification module 274, and verification module 275. In some implementations, the speech corpus buffer 271 includes non-transitory memory provided to store training and validation data including, for example, continuous large vocabulary speech and/or phoneme sequences. In some implementations, as described in greater detail below with reference to FIG. 6, the training set synthesizer 272 is configured to synthesize a respective targeted training data set for each of one or more problematic phonemes. The targeted training data buffer 273 includes non-transitory memory provided to store the respective targeted training data sets produced by the training set synthesizer 272. In some implementations, also as described in greater detail below with reference to FIG. 6, the spectral features assessment and modification module 274 is configured to modify a respective targeted training data set in order to emphasize spectral differences between the corresponding problematic phoneme and at least one conflicting phoneme that the problematic phoneme is often misclassified as. In some implementations, the verification module 275 is configured to iteratively train various portions of the expert-assisted phoneme recognition neural network system 300 using corresponding the target training data sets and/or the modified targeted training data sets, and/or validation data included in the speech corpus buffer 271.

Figure 3:
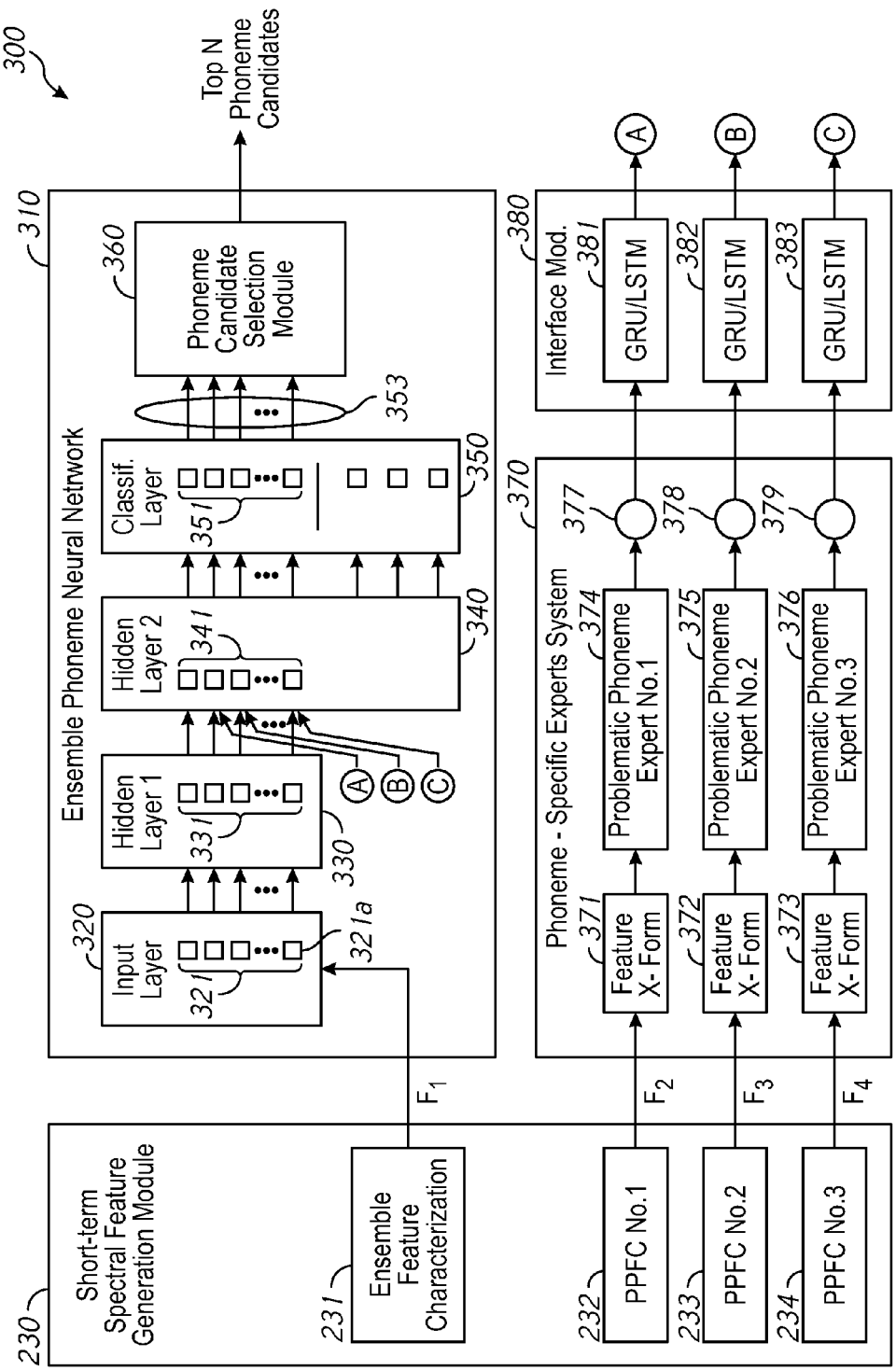
FIG. 3 is a block diagram of an implementation of an expert-assisted phoneme recognition neural network system according to some implementations.

FIG. 3 is a block diagram of the expert-assisted phoneme recognition neural network system 300 in accordance with some implementations. Portions of FIG. 3 are adapted from FIG. 2A, and as such elements common to each include common reference numbers, and only the differences between FIGS. 3 and 2A are described herein for the sake of brevity. Again, while pertinent features are shown, those of ordinary skill in the art will appreciate from the present disclosure that various other features have not been illustrated for the sake of brevity and so as not to obscure more pertinent aspects of the example implementations disclosed herein. FIG. 3 also includes a more detailed illustration of portions of the short-term spectral feature generation module 230 (shown in FIG. 2A) that are pertinent to the expert-assisted phoneme recognition neural network system 300.

As a non-limiting example, the expert-assisted phoneme recognition neural network system 300, in various implementations, includes an ensemble phoneme recognition neural network 310, a phoneme-specific experts system 370, and an interface module 380. The ensemble phoneme recognition neural network 310 is configured to recognize or distinguish individual phonemes with respect to all other phonemes. For a majority of phonemes, the ensemble phoneme recognition neural network 310 performs with a relatively high level of accuracy without support from the phoneme-specific experts system 370. However, in various implementations, for problematic phonemes, the accuracy of the ensemble phoneme recognition neural network 310 is lower without the aid of the phoneme-specific experts system 370. Accordingly, the phoneme-specific experts system 370 is configured and provided to support the operation of the ensemble phoneme recognition neural network 310 in the process of recognizing problematic phonemes, which are difficult to detect and are frequently misidentified as other similar sounding phonemes.

In order to support the operation the expert-assisted phoneme recognition neural network system 300, the short-term spectral feature generation module 230 provides a plurality of feature streams ($F_1$, $F_2$ to $F_n$) for targeted uses. Each of the plurality of feature streams ($F_1$, $F_2$ to $F_n$) is generated from frequency domain representations of the one or more frames of audible signal data are stored in the frame buffer 205. In some implementations, each feature stream is provided on a frame-by-frame basis. In various implementations, the plurality of feature streams includes a first feature stream ($F_1$) that is specifically generated (or synthesized) for the ensemble phoneme recognition neural network 310. Accordingly, in some implementations, the short-term spectral feature generation module 230 includes an ensemble feature characterization sub-module 231 that is configured to synthesize the first feature stream ($F_1$) for use by the ensemble phoneme recognition neural network 310. The first feature stream ($F_1$) is generated to include a sufficient number of spectral features in order to enable the ensemble phoneme recognition neural network 310 to recognize a majority of phonemes with relatively high accuracy. In some implementations, for example, the first feature stream ($F_1$) includes approximately 35-65 spectral features. In one implementation, approximately 40 power normalized cepstral coefficients (PNCCs) are included in the first feature stream ($F_1$).

Additionally, in various implementations, the plurality of feature streams generated by the short-term spectral feature generation module 230 includes one or more targeted problematic phoneme feature streams ($F_2$ to $F_n$)—which are also referred to as target feature streams. Each of the targeted feature streams ($F_2$ to $F_n$) is synthesized and provided to the phoneme-specific experts system 370 for use by a respective one of a number of constituent problematic phoneme-specific expert neural networks (PPENNs). Those of ordinary skill in the art will appreciate from the present disclosure that the targeted feature streams ($F_2$ to $F_n$) are not necessarily wholly independent from one another or the first feature stream ($F_1$). For example, PNCC coefficients in combination with other relevant features that target the second formant for "ih" versus "uh" detection may be included in two or more feature streams. In various implementations, in order to synthesize the targeted feature streams ($F_2$ to $F_n$) the short-term spectral feature generation module 230 includes a respective number of problematic phoneme feature characterization (PPFC) sub-modules. Each PPFC sub-module is configured to synthesize and provide a corresponding one of the targeted feature streams ($F_2$ to $F_n$) to a respective PPENN in the phoneme-specific experts system 370. As an example, the short-term spectral feature generation module 230 shown in FIG. 3 includes first, second and third PPFCs 232, 233, 234 that are respectively configured to produce corresponding second, third and fourth feature streams ($F_2$, $F_3$, $F_4$). Those of ordinary skill in the art will appreciate that in various implementations, a system may include one or more PPFCs, and that the three PPFCs are merely shown as an example.

Each problematic phoneme feature stream ($F_2$ to $F_n$) includes a respective set of targeted spectral features that characterize the a-priori phonetic and acoustic knowledge utilized to identify a particular problematic phoneme. Each respective set of targeted spectral features is beneficial to a respective PPENN for distinguishing a single target problematic phoneme as distinct from one or two other specific phonemes based linguistically supported attributes. The one or two other specific phonemes are selected because the target problematic phoneme is highly likely to be misclassified as one of these phonemes without focused attention to the spectral feature differences—that the ensemble phoneme recognition neural network 310 is not configured to provide based on the desire to tightly constrain the resources of the system 300. As an example, if the second feature stream ($F_2$) is provided to help distinguish the phoneme "uh" from the phoneme "ih," the first PPFC 232 is configured to generate spectral features including PNCCs and a Gammatone filtered spectrum around the $2^{nd}$ and $3^{rd}$ formants. Similarly, in another example, in order to distinguish "th" from "f," a PPFC is configured to generate spectral features including PNCCs and linguistically informed spectral moments. In particular, the spectral slope is a significant source of contrast for distinguishing "th" from "f". As another example, to distinguish "b" from "d", a PPFC is configured to generate spectral features including PNCCs and group-delay features that isolate differences in the energy of respective plosive bursts for each sound.

Figure 2C:
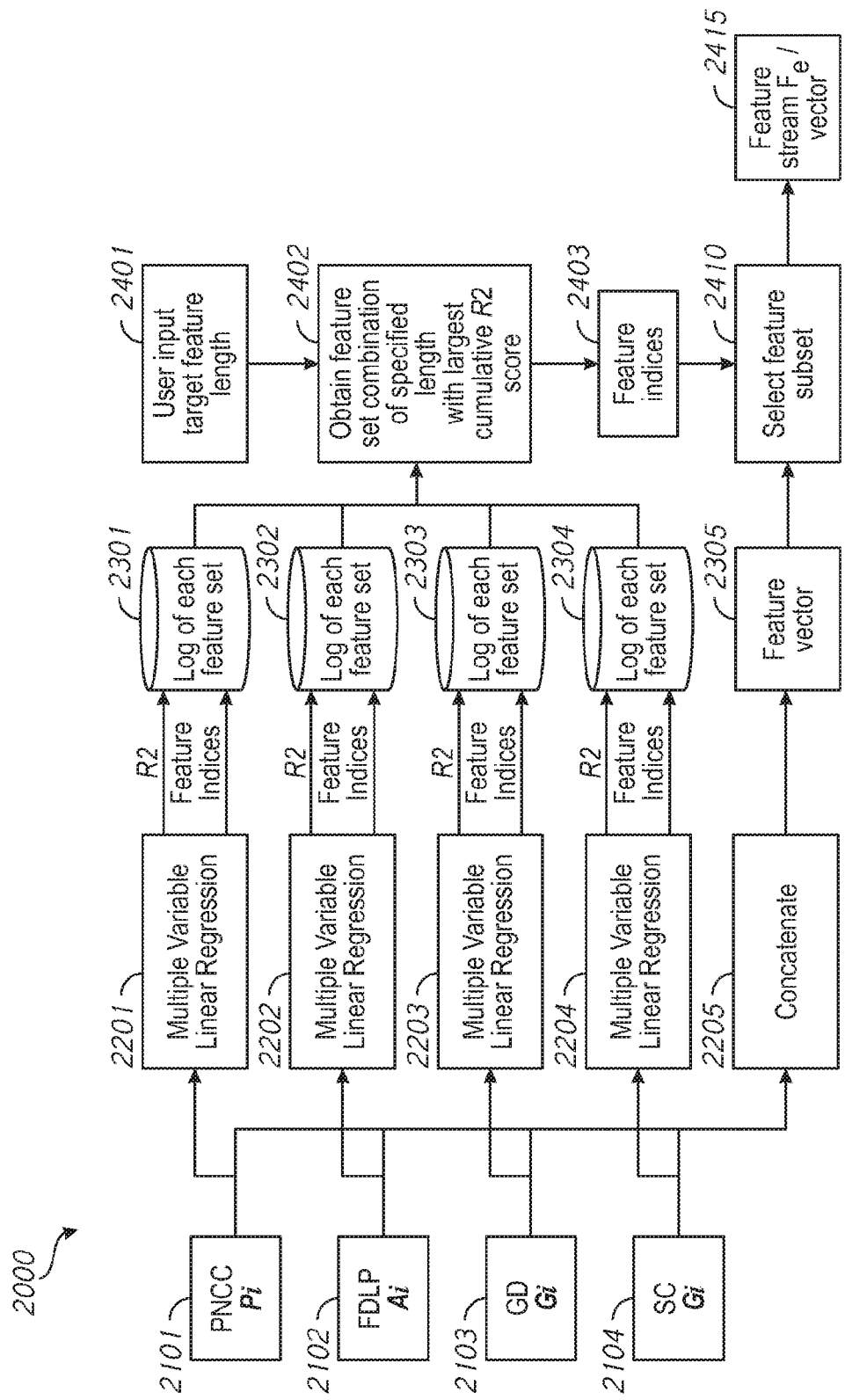
FIG. 2C is a block diagram of a feature characterization process flow in accordance with some implementations.

For example, with reference to the feature characterization process flow 2000 of FIG. 2C, given features like Power Normalized Cepstral Coefficients (PNCC), Frequency Domain Linear Prediction (FDLP) (2102), Group Delay Features (GD) (2103) and Spectral Characteristics (SC) (2104) the goal is to select individual feature streams $F_e$ which is one of $F_2, \ldots, F_E$ for each of the one or more phoneme experts within the phoneme-specific experts system 370 (shown in FIG. 3). The feature stream $F_1$ is used to denote the feature stream that is supplied to the ensemble phoneme recognition neural network 310.

With reference to FIGS. 2B and 2, for each speech frame, i, the spectral feature characterization module 210, in parallel, extracts PNCC (2101), FDLP (2102), GD (2103) and SC (2104) features, and concatenates (2205) these individual features into a super-set feature vector $X_i$ (2215). For example, with a concatenation of 39 dimensional PNCC features $P_i$, 39 dimensional FDLP features $A_i$, 24 dimensional GD features $G_i$, and 8 dimensional spectral moments $S_i$—the size of $X_i$ is 110. Each feature stream $F_1, \ldots, F_E$ is then a sub-set of this super-set feature vector $X_i$. For example, PNCC feature vectors consist of 39 elements. These correspond to the first 39 elements of $X_i$ (after feature concatenation, as explained above). So feature stream $F_1$ would essentially be obtained by selecting the first 39 elements of $X_i$ (2215). The problem remains as to how the elements corresponding to feature streams $F_2, \ldots, F_E$ are selected.

In some implementations, multiple variable regression is utilized to select a subset of a features, based on the extracted PNCC (2101), FDLP (2102), GD (2103) and SC (2104) features, as indicated by 2201, 2202, 2203, 2204 in FIG. 2C. In the context of training the phoneme-specific experts system 370, the goal is to select a feature subset such that is pertinent to the target and competitor phoneme pair (e.g., 'uh' vs 'ih'). For the purpose of illustration, let the sub-set of $X_i$ for the feature stream $F_e$ for the 'uh' vs 'ih' expert e be denoted by $x_i$. The reduction from $X_i$ to $x_i$ for a particular expert e to generate a particular feature stream $F_e$ is obtained to multiple variable regression feature selection. The size of feature vector $x_i$ for feature stream $F_e$ can be specified by a user or another system (2401).

Training data is labeled such that each speech frame i has a corresponding ground-truth label $y_i$, where $y_i=1$ if the speech frame corresponds to that from a target phoneme, and 0 if it belongs to the competitor or any other phoneme. Applying multiple variable regression (2201, 2202, 2203, 2204) tries to fit a line using regression coefficients β, given the elements of a feature vector (e.g., $P_i$, $A_i$, $G_i$ or $S_i$) to predict the label $y_i$. Here $y_i$ is used to denote the predicted label as a result of multiple variable linear regression. It assumed here that i is one of $N_e$ examples selected for training expert network e. The regression coefficients are estimated using all examples $N_e$. For example, if the $k^{th}$ element of $P_i$ is denoted by $P_i^k$ then a linear regression using example i can be written as, $$\hat{y}_i = 1 + \beta_1 P_i^1 + \ldots + \beta_k P_i^k + \ldots + \beta_K P_i^K.$$

Here K is used to denote the total number of elements in the vector $P_i$. The goodness of a linear regression fit is usually determined by what is usually called the $R^2$ metric which is defined:

$$R^2 = \Sigma_{i=1}^{N_e}(\hat{y}_i - \bar{y})^2 / \Sigma_{i=1}^{N_e}(y_i - \bar{y})^2$$

Here $$\bar{y} = \frac{1}{N_e} \sum_{i=1}^{N_e} y_i$$

is used to denote the average value of all the ground-truth labels in the training set. Feature selection is carried out by setting the corresponding regression variable in the $k^{th}$ position, i.e., $\beta_k=0$, and retaining those that contribute to increasing the $R^2$ metric (e.g., in some implementations, the higher the value, the better). In some implementations, the $R^2$ values and the featured indices are stored to disk (or the like) for each feature set.

In a second step for a given target vector size ranging from 1 to 110 (the total feature size of the concatenated feature vector $X_i$) a cumulative $R^2$ value is calculated by looking up the records of all $R^2$ values for all feature sizes across the four example feature types, namely—$P_i$, $A_i$, $G_i$ and $S_i$. Finally, the feature set combination that matches the particular target size specified by the user and has the highest cumulative $R^2$ value is chosen (2402). The individual feature elements are chosen by looking up records of feature indices (2403) maintained for each feature type that contributed to this maximum cumulative $R^2$ sum. If the resulting best index vector containing all of the indices is denoted by I, then elements of $x_i$ are populated by looking up elements of $X_i$ with element indexes specified in I(2410). The output feature stream $F_e$ (2415) corresponds to the outputs of 231,232, 233 and 234 in FIG. 3.

The ensemble phoneme recognition neural network 310 is configured to recognize individual phonemes with respect to all other phonemes in a sequence of audible signal data. The ensemble phoneme recognition neural network 310 uses the spectral features included in the first feature stream ($F_1$) that was synthesized from the sequence of audible signal data obtained by the microphone 201. As noted above, for the majority of phonemes, the ensemble phoneme recognition neural network 310 performs with a relatively high level of accuracy without support from the phoneme-specific experts system 370. In various implementations, the ensemble phoneme recognition neural network 310 is able to recognize or distinguish a majority of phonemes with 75-80% accuracy (or above), and in some implementation within a tolerable error threshold ranging from 2-5%. However, in various implementations, for problematic phonemes, the accuracy of the ensemble phoneme recognition neural network 310 is lower without the aid of the phoneme-specific experts system 370. The problematic phonemes tend to occur rarely in nominal speech patterns for a particular language. For example, some problematic phonemes occur as low as 0.1% of the time in nominal speech patterns for a particular language, which is well below the typical lower boundary tolerable error threshold values. As a result, without the aid of the phoneme-specific experts system 370, the ensemble phoneme recognition neural network 310 is likely to misclassify a problematic phoneme as one or two other specific phonemes. In part, this is because the ensemble phoneme recognition neural network 310 is not configured to provide focused attention to the spectral feature differences. The ensemble phoneme recognition neural network 310 cannot provide that focused attention to the spectral feature differences without attendant exponential growth in computational complexity, memory demand, and inputs—which would make implementations unacceptable for low-power, real-time and/or low-latency devices, such as hearing aids and mobile devices. Accordingly, in various implementations, the ensemble phoneme recognition neural network 310 is tightly resource constrained, as compared to previously known neural network approaches.

Referring to FIG. 3, in various implementations, the ensemble phoneme recognition neural network 310 includes a LSTM (long short-term memory) RNN having an input layer 320, a first hidden layer 330, a second hidden layer 340, and a classification layer 350. While the ensemble phoneme recognition neural network 310 of FIG. 3 includes two hidden layers as an example, those of ordinary skill in the art will appreciate from the present disclosure that one or more additional hidden layers are also present in various implementations. Adding additional hidden layers adds to the computational complexity and memory demands, but may improve performance for some applications.

The input layer 320 is coupled to receive the first feature stream ($F_1$) from the ensemble feature characterization sub-module 231. The input layer 320 includes a number of LSTM logic units 321, which are also referred to as neurons by those of ordinary skill in the art. In some such implementations, an input matrix from the features to the LSTM logic units include rectangular matrices. The size of this matrix is a function of the number of spectral features included in the first feature stream ($F_1$). The first hidden layer 330 also includes a number of LSTM logic units 331. Similar to the input layer 320, the number of LSTM logic units 331 ranges between approximately 10-500. Those of ordinary skill in the art will appreciate that number of LSTM logic units per layer is orders of magnitude smaller than previously known approaches (being of the order of $O(10^1)$-$O(10^2)$), which allows such implementations to be embedded in highly resource-constrained devices.

In some implementations, the second hidden layer consists of as many logic units as in the input layer 320 or first hidden layer 330. In the example shown in FIG. 3, the logic units in the second hidden layer receive two sets of inputs. The first set of inputs come from the previous hidden layer, and the second set of inputs labeled A, B, C come from the phoneme specific experts system 370. In other words, the inputs from A, B, C are fed to 341. Two separate rectangular weight matrices connect the two sets of inputs to the logic units in the second layer. The second hidden layer 340 includes a first set of LSTM logic units 341. The first set of LSTM logic units 341 includes a number of logic units that corresponds to a function of the number of spectral features included in the first feature stream ($F_1$). In various implementations, the number of logic units in first set of LSTM logic units 341 is approximately equal to the number of logic units in the input layer 320 or the first hidden layer 330. The classification layer 350 includes an implementation of a multinomial logistic function (e.g., a soft-max function) that produces a number of outputs that is approximately equal to the number of phonemes. Each output includes a probability or a confidence measure for a particular phoneme as determined by the RNN for the current spectral frame.

In various implementations, the classification layer 350 is also configured to include a number of outputs 353 that corresponds to a total number of possible unique phonemes that could be detected within continuous large vocabulary speech sequences. In some implementations, the superset of all phonemes present in any human language can be used as possible unique phoneme outputs. This superset may include more than 80 consonants, more than 30 vowels and a multitude of clicks. In other implementations, for efficiency, the set of unique phonemes will be a subset of the all-phoneme superset, tailored to a specific language (e.g., 39 phonemes for American English). The outputs 353 are coupled to a phoneme candidate selection module 360. In various implementations, the phoneme candidate selection module 360 is configured to select the top N phoneme candidates based on the corresponding values provided at the outputs 353. In some implementations, the top N phoneme candidates are the most likely phonemes present in a given frame. In some implementations, the phoneme candidate selection module 360 selects a single most likely phoneme for a frame based on the corresponding values provided at the outputs 353.

In operation, the ensemble phoneme recognition neural network 310 learns to make decisions from the combination of sub-optimal detection indicator values received from the phoneme-specific experts system 370. In particular, the ensemble phoneme recognition neural network 310 learns to balance sub-optimal detection indicator values associated with one or more conflicting problematic phonemes, as opposed to making hard decisions based on just one of the sub-optimal detection indicator values. Indicator values from the phoneme-specific experts system 370 are appended to activation values from a previous processing layer going into a subsequent layer of the ensemble phoneme recognition network 310. The indicator values are weighted appropriately when provided as higher-level features to the logic units of the subsequent layer. If the layer at which the indicator values are introduced contain recurrent logic units, the indicator values could also feedback into other logic units of the same layer through weighted recurrent connections. The weight values to logic units in the subsequent layer and current layer (recurrent connections) are learned from the data. The learning takes place in the context of a back-propagation method that works by looking misclassifications in the output layer and generating an error signal. A gradient is calculated for the weights in that layer so that the error is reduced. The error signal coming from the output layer is then propagated back to the layers below. Gradients are similarly calculated for all sets of weights in the hidden layers so that the misclassification in the output layer is reduced. The gradient updates are applied to each set of weights after looking at either an entire speech sequence or a set of speech sequences. In learning these weights by associating these indicator values to the phoneme labels during training, the network is able to learn when to use these indicator values and when to ignore them. During training, classification errors are propagated backward through the ensemble phoneme recognition network 310 in order to adjust and learn the weights so that misclassifications on subsequent examples are reduced. The errors that are propagated back to the point of entry of the indicator values are used only to update the weights connecting the outputs of the experts to logic units (of the ensemble phoneme recognition network 310) in the subsequent processing layer and the weights connecting to the logic units (of the ensemble phoneme recognition network 310) in the same layer.

In various implementations, the phoneme-specific experts system 370 includes a number of problematic phoneme-specific expert neural networks (PPENNs). As illustrated in FIG. 3, for the sake of example only, the phoneme-specific experts system 370 includes first, second, and third PPENNs 374, 375, 376. In some implementations, each of the three PPENNs 374, 375, 376 includes a respective low complexity LSTM RNN. For example, in various implementations, each respective low complexity LSTM RNN includes two layers, which each have 10-30 logic units (or neurons). Each respective low complexity LSTM RNN is configured to make a determination regarding the presence of a specific target problematic phoneme based on a corresponding feature stream ($F_2$ to $F_n$).

In various implementations, each of the three PPENNs 374, 375, 376 is included in a respective processing chain that is configured to distinguish a respective target problematic phoneme as distinct from one or two other specific phonemes. In various implementations, each processing chain is provided for at least one problematic phoneme that conflicts with at least one other problematic phoneme, in terms of being similar sounding and difficult to distinguish from one another. In other words, in some implementations, a processing chain provides a detection indicator value for at least one problematic phoneme that conflicts with at least one other problematic phoneme that is associated with another processing chain. For example, in various implementations, one or more PPENNs are provided in combination within the phoneme-specific experts system 370 as follows.

With reference to FIG. 3, for example, the first PPENN 374 is included in series between a first feature transform module 371 and a first output gate 377. Similarly, the second PPENN 375 is included in series between a second feature transform module 372 and a second output gate 378. Similarly, the third PPENN 376 is included in series between a third feature transform module 373 and a third output gate 379. Those of ordinary skill in the art will appreciate that in various implementations, a phoneme-specific experts system may include one or more PPENNs, and that the three PPENNs, illustrated in FIG. 3 along with corresponding supporting elements, are merely shown as an example.

Rather than detecting classes of phonemes like the structured neural networks of previous approaches, each of the first, second, and third PPENNs 374, 375, 376 is configured and trained to recognize, or estimate detection of, a single target problematic phoneme as distinct from one or two other specific phonemes. In some instances, but not always, the one or two other specific phonemes are within the same class of phonemes as the target problematic phoneme. The one or two other specific phonemes are selected because the target problematic phoneme is highly likely to be misclassified as one of these phonemes without focused attention to the spectral feature differences (e.g., the phonemes "uh" and "ih" are very difficult to distinguish using previously available machine-listening approaches). As noted above, the ensemble phoneme recognition neural network 310 cannot provide that focused attention to the spectral feature differences without attendant exponential growth in computational complexity, memory demand, and inputs from the short-term spectral feature generation module 230. As such, a respective output of each of the first, second, and third PPENNs 374, 375, 376 includes a corresponding detection indicator value provided to a hidden layer of the ensemble phoneme recognition neural network 310. As described above, in some implementations, the detection indicator values are provided to logic units in the second hidden layer 340. Additionally and/or alternatively, in some implementations, the detection indicator values are provided to logic units in the first hidden layer 330 and/or to another hidden layer (not shown) included between the second hidden layer 340 and the classification layer 350. In some implementations, the detection indicator value provides an indication characterizing when the PPENN has detected the target problematic phoneme in accordance with a detection threshold associated with the target problematic phoneme.

As noted above, the plurality of feature streams generated by the short-term spectral feature generation module 230 includes one or more targeted feature streams ($F_2$ to $F_n$)—the corresponding second, third and fourth feature streams ($F_2$, $F_3$, $F_4$) as illustrated in FIG. 3 as an example. Each of the targeted feature streams ($F_2$, $F_3$, $F_4$) is provided to a respective processing chain including one of the first, second, and third PPENNs 374, 375, 376. More specifically, continuing the example of FIG. 3, the first PPFC 232 provides the second feature stream ($F_2$) to the first feature transform module 371. In various implementations, the first feature transform module 371 is configured to apply a linear discriminant analysis transform to the second feature stream ($F_2$). The linear discriminant analysis transform is applied in order to emphasize differences in the spectral features between a first single target problematic phoneme and the one or two other specific phonemes. In some implementations, other transforms, such as heteroscedastic linear discriminant transforms or a variant of principal components analysis, are used instead of applying a linear discriminant analysis transform. Similarly, the second PPFC 233 provides the third feature stream ($F_3$) to the second feature transform module 372, which is configured to apply a transform in order to emphasize differences in the spectral features between a second single target problematic phoneme and one or two other specific phonemes. Similarly, the third PPFC 234 provides the fourth feature stream ($F_4$) to the third feature transform module 373, which is configured to apply a transform in order to emphasize differences in the spectral features between a third single target problematic phoneme and one or two other specific phonemes.

The transformed feature streams ($F_2$, $F_3$, $F_4$) are provided to the respective PPENNs 374, 375, 376. Each of the PPENNs 374, 375, 376 then operates to determine a corresponding detection indicator value. In some implementations, the detection indicator value provides an indication characterizing when a PPENN has detected the target problematic phoneme in accordance with a detection threshold. In some implementations, each of one or more problematic phonemes is associated with a particular corresponding detection threshold based on the targeted spectral features selected for use by a particular PPENN. In some implementations, the detection indicator value provides a confidence level (e.g., a probability value) characterizing the extent to which portions of an audible signal satisfy a detection threshold. In some implementations, the detection indicator value provides a flag indicating a binary detection result.

The detection indicator values are provided to the interface module 380. In various implementations, the interface module 380 includes a number of logic units configured to provide a gating function between the phoneme-specific experts system 370 and the ensemble phoneme recognition neural network 310. More specifically, with reference to FIG. 3, the interface module 380 includes first, second, and third logic units 381, 382, 383. The first, second, and third logic units 381, 382, 383, once trained can be used to remember or forget respective detection indicator values for a particular time frame and for each respective PPENN 374, 375, 376. In some implementations, the logic units include LSTM logic units. In some implementations, the logic units include GRU (gated recurrent unit) logic units. The respective outputs of the first, second, and third logic units 381, 382, 383 are coupled to the first, second and third 342a, 342b, 342c LSTM logic units included in the second hidden layer 340 (or another hidden layer) of the ensemble phoneme recognition neural network 310.

The interface module 380 helps to interface the output of the phoneme-specific experts system 370 with the ensemble phoneme recognition neural network 310. A phoneme-specific expert could have either one or two outputs. In some implementations, in the case of a single output (with an output sigmoidal unit), the value is ranges between 0 and 1. A high value indicates the presence of target phoneme, and a zero indicates otherwise. In some implementations, in the case of two outputs (with a soft-max layer), one of the outputs indicates the presence of the target phoneme and the other output indicates the presence of a competitor phoneme. In some implementations, in the soft-max layer both outputs are constrained to sum to 1, and the two outputs are complementary to each other.

Considering experts with two outputs per expert, the outputs from all experts can be collected into a vector:

$$p_t = [p_1\ 1-p_1\ p_2\ 1-p_2 \ldots p_E\ 1-p_E].$$

In some implementations, the interface module 380 utilizes the vector $p_t$ within a function $f$ operating on the vector $p_t$ to produce a vector output $q_t = f(p_t)$. In various implementations, the function can range in complexity between an identity function to a more complex non-linear function like a typical neural network sigmoidal unit or a set of LSTM/GRU units. This output vector $q_t$ is then weighted by a matrix $W_{qx}$ (x denotes the respective input/gate of the LSTM unit in the next layer) and appears as an additive term to all of the LSTM equations described below with reference to FIG. 5A.

$$h_t = o_t \tan h(c_t) \tag{i}$$

$$o_t = \tan h(W_{xo}x_t + W_{ho}h_{t-1} + W_{qo}q_t + b_o) \tag{ii}$$

$$f_t = \tan h(W_{xf}x_t + W_{hf}h_{t-1} + W_{qf}q_t + b_f) \tag{iii}$$

$$i_t = \tan h(W_{xi}x_t + W_{hi}h_{t-1} + W_{qi}q_t + b_i) \tag{iv}$$

$$r_t = \tan h(W_{xc}x_t + W_{hc}h_{t-1} + W_{qc}q_t + b_c) \tag{v}$$

Figure 4:
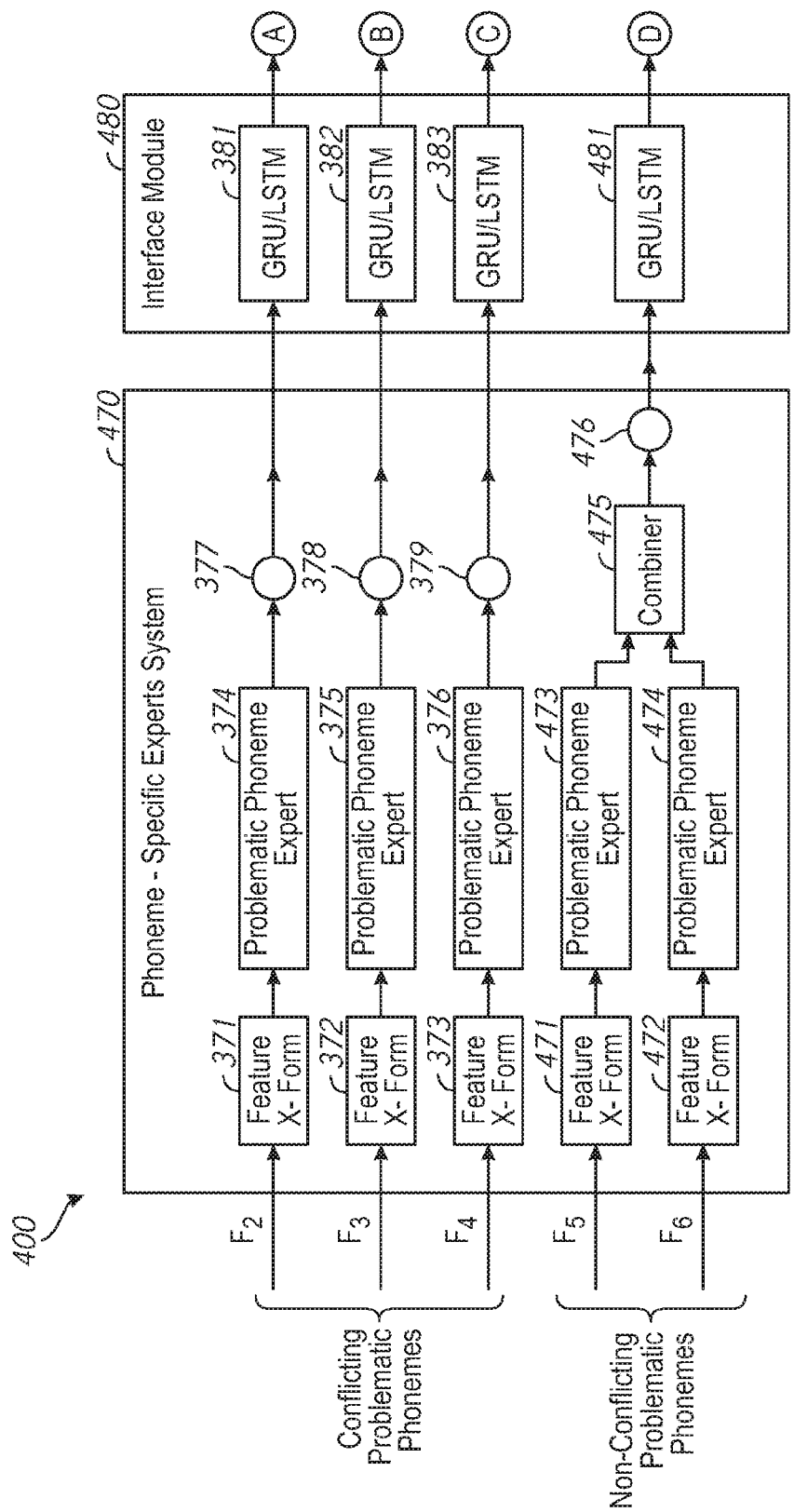
FIG. 4 is a block diagram of another implementation of a portion of an expert-assisted phoneme recognition neural network system according to some implementations.

FIG. 4 is a block diagram of another implementation of a portion of an expert-assisted phoneme recognition neural network system 400 according to some implementations. The system 400 illustrated in FIG. 4 is similar to and adapted from the system 300 illustrated in FIG. 3, and focuses only on the pertinent differences. Accordingly, elements common to FIGS. 3 and 4 include common reference numbers, and only the differences between FIGS. 3 and 4 are described herein for the sake of brevity.

As noted above with reference to FIG. 3, in various implementations, each of the three PPENNs 374, 375, 376 is included in a respective processing chain provided for a corresponding problematic phoneme that conflicts with one another problematic phoneme, in terms of being similar sounding and difficult to distinguish from one another. However, in some instances, two or more problematic phonemes, while difficult to recognize individually, do not conflict with one another. For example, both "uh" and "th" are difficult to identify, but are sufficiently different acoustically they are never confused for one another. With this in mind, in various implementations, the phoneme-specific experts system 370 of FIG. 3 can be modified in order to produce a phoneme-specific experts system 470, as shown in FIG. 4.

In addition to the three processing chains including the respective three PPENNs 374, 375, 376, the phoneme-specific experts system 470 also includes another processing chain including fourth and fifth PPENNs 473, 474, having outputs that are combined into a single detection indicator value. The fourth and fifth PPENNs 473, 474 are provided for two respective problematic phonemes that do not conflict with one another, in terms of being similar sounding and difficult to distinguish from one another. The fourth PPENN 473 is provided in series between a fourth feature transform module 471 and a combiner 475. Similarly, the fifth PPENN 474 is provided in series between a fifth feature transform module 472 and the combiner 475. The fourth feature transform module 471 is coupled to receive a fifth feature stream ($F_5$) from a respective sub-module (not shown) in the short-term spectral feature generation module 230. Similar to the first feature transform module 371, the fourth feature transform module 471 is configured to emphasize differences in the spectral features between a fourth single target problematic phoneme and the one or two other specific phonemes. The fifth feature transform module 472 is coupled to receive a sixth feature stream ($F_6$) from a respective sub-module (not shown) in the short-term spectral feature generation module 230. Also similar to the first feature transform module 371, the fifth feature transform module 472 is configured to emphasize differences in the spectral features between a fifth single target problematic phoneme and the one or two other specific phonemes. The combiner 475 is configured to combine respective detection indicator values provided by the fourth and fifth PPENNs 473, 474 into a single detection indicator value, which is provided to a fourth output gate 476.

Additionally, in various implementations, the interface module 380 of FIG. 3 is also modified in order to produce an interface module 480, as shown in FIG. 4. In addition to the first, second, and third logic units 381, 382, 383 included in the interface module 380, the interface module 480 also includes a fourth logic unit 481. Similar to FIG. 3, the first, second, third, and fourth logic units 381, 382, 383, 481 once trained can be used to remember or forget respective detection indicator values for a particular time frame and for each respective PPENN 374, 375, 376 and the combined output of the fourth and fifth PPENNs 473, 474. In some implementations, the logic units include LSTM logic units. In some implementations, the logic units include GRU (gated recurrent unit) logic units. The respective outputs of the first, second, third, and fourth logic units 381, 382, 383, 481 are coupled to the corresponding LSTM logic units included in the second hidden layer 340 of the ensemble phoneme recognition neural network 310 (or another hidden layer).

Figure 5A:
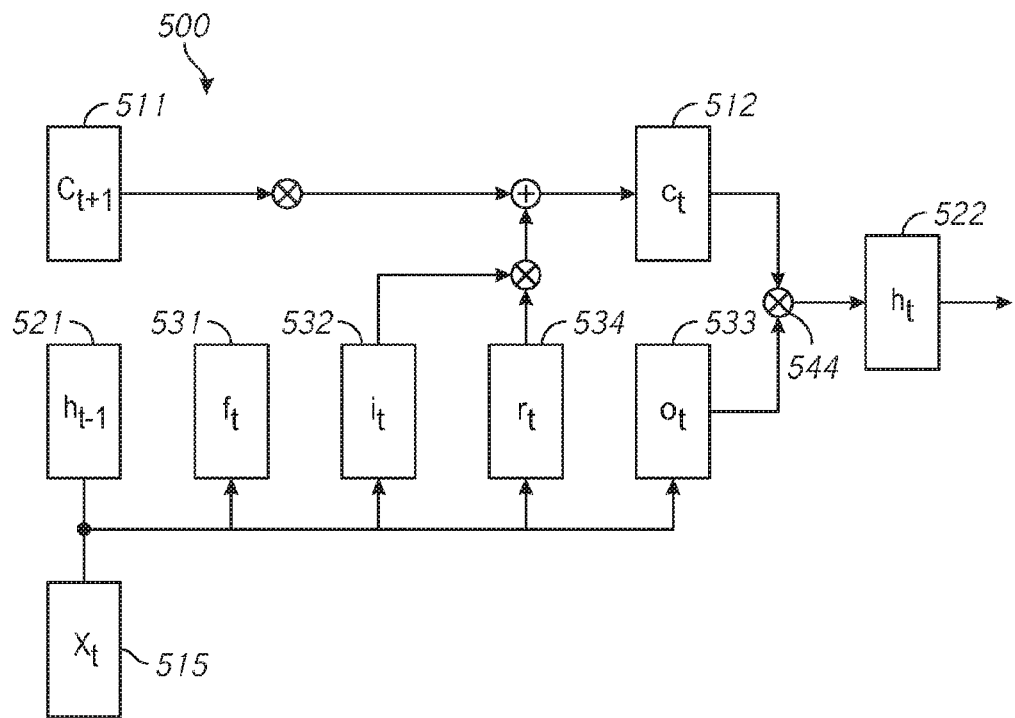
FIG. 5A is a block diagram of a LSTM (long short-term memory) logic unit configured for use in various implementations of an expert-assisted phoneme recognition neural network system in accordance with some implementations.

FIG. 5A is a block diagram of a LSTM (long short-term memory) logic unit 500 configured for use in various implementations of an expert-assisted phoneme recognition neural network system in accordance with some implementations. Those of ordinary skill in the art will appreciate from the present disclosure that the LSTM logic unit 500 is also referred to as a single block of a LSTM RNN system. In some implementations of LSTM logic unit 500, each LSTM block of the LSTM RNN includes one or more memory cells. For illustrative purposes a single memory cell per LSTM block is assumed in the following description. Moreover, while pertinent features are illustrated, those of ordinary skill in the art will appreciate from the present disclosure that various other features have not been illustrated for the sake of brevity and so as not to obscure more pertinent aspects of the implementations disclosed herein.

In order to describe the operation of LSTM logic unit 500, vector and scalar mathematical variables are used. Vector quantities are described in bold, e.g., $\mathbf{x}_t$. Scalar quantities are indicated in regular font, e.g., $c_{t-1}$. As shown in FIG. 5A, the LSTM logic unit 500 includes a memory cell which holds content $c_{t-1}$ (511) from a previous time step, a forget gate $f_t$ (531), an input gate $i_t$ (532), and an output gate $o_t$ (533). The output of LSTM logic unit 500 at current time t is $h_t$ (522). Output values $h_t$ from all LSTM logic units in a layer are collected into a vector $\mathbf{h}_t$. Input to the LSTM logic unit 500 includes a set of outputs $h_{t-1}$ (521) from all LSTM logic units of the same layer from the previous time step and an input vector $\mathbf{x}_t$ (515). Using the quantities $\mathbf{x}_t$ (515), $c_{t-1}$ (511), $h_{t-1}$ (521), $f_t$ (531), $i_t$ (532) and $o_t$ (533), the LSTM logic unit 500 operates to update memory cell with $c_t$ (512) and produce the output $h_t$ (522). The memory cell contains buffered cell content $c_{t-1}$ (511) from a prior iteration or time period t−1. The memory cell operates as a "slow" hidden state in order to reduce problems associated with a vanishing gradient during training and allows the LSTM logic unit to remember events over longer time spans. The output $h_t$ (522) of the LSTM logic unit 500 is provided by equation (1) as follows:

$$h_t = o_t \tan h(c_t) \quad (1)$$

In equation (1), $o_t$ is the output value of the output gate $o_t$ (533), which modulates the amount of memory content exposure. In some implementations, the output gate value is provided by equation (2) as follows:

$$o_t = \tan h(W_{xo}x_t + W_{ho}h_{t-1} + b_o) \quad (2)$$

In various implementations, the forget gate $f_t$ (531) is configured to modulate the extent to which the existing memory of the LSTM logic unit 500 is forgotten. In some implementations, the forget gate value is provided by equation (3) as follows:

$$f_t = \tan h(W_{xf}x_t + W_{hf}h_{t-1} + b_f) \quad (3)$$

Similarly, the input gate $i_t$ (532) is configured to modulate the degree to which the new memory content is added to the memory cell content of the LSTM logic unit 500. In some implementations, the input gate value is provided by equation (4) as follows:

$$i_t = \tan h(W_{xi}x_t + W_{hi}h_{t-1} + b_i) \quad (4)$$

In order to calculate new cell content $c_t$ an intermediate quantity $r_t$ (534) is calculated by equation (5) as follows:

$$r_t = \tan h(W_{xc}x_t + W_{hc}h_{t-1} + b_c) \quad (5)$$

In turn, updated content for the new content memory cell $c_t$ (512) is determined by equation (6) as follows:

$$c_t = f_t c_{t-1} + i_t r_t \quad (6)$$

With reference to equations (1) to (6), the matrices $W_x^*$ are weights, and the vectors $b^*$ are biases. The values of the weight matrices $W_x^*$ are adjusted during a training mode of a LSTM based neural network until an error convergence threshold is satisfied. In some implementations, the weights are further adjusted during nominal operation, as the neural network learns from real-valued audible signal data.

Figure 5B:
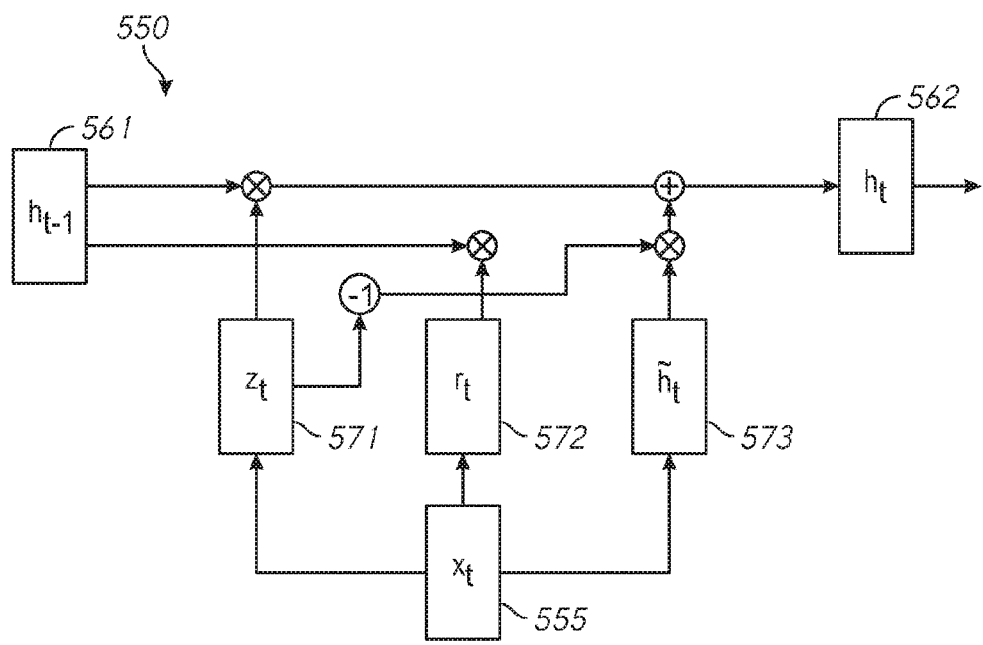
FIG. 5B is a block diagram of a GRU (gated recurrent unit) logic unit configured for use in various implementations of an expert-assisted phoneme recognition neural network system in accordance with some implementations.

FIG. 5B is a block diagram of a GRU (gated recurrent unit) logic unit 550 configured for use in various implementations of an expert-assisted phoneme recognition neural network system in accordance with some implementations. Those of ordinary skill in the art will appreciate from the present disclosure that the GRU logic unit 550 is an alternative to LSTM logic unit 500. As shown in FIG. 5B, the GRU logic unit 550 includes a previous activation memory $h_{t-1}$ (561), an input $x_t$ (555), an update gate $z_t$ (571), a reset gate $r_t$ (572), a candidate activation gate $\tilde{h}_t$ (573), and an activation memory $h_t$ (562). The input $x_t$ (555) is provided to receive and buffer new input values to the GRU logic unit 550. The activation memory $h_t$ (562) is provided to store and provide the output of the GRU logic unit 550. As would be understood by those of skill in the art, the activation value $h_t$ of the GRU logic unit 550 at time t uses a linear interpolation, between the previous activation value $h_{t-1}$ and the candidate activation value $\tilde{h}_t$, and is provided by equation (6) as follows:

$$h_t = (1-z_t)h_{t-1} + z_t \tilde{h}_t \quad (6)$$

The update gate $z_t$ (571) is configured to determine how much GRU logic unit 550 the updates the activation, or content, and is provided by equation (7) as follows:

$$z_t = \text{sigm}(W_{xz}x_t + W_{hz}h_{t-1} + b_z) \quad (7)$$

The reset gate $r_t$ (572) value is similarly provided by equation (8) as follows:

$$r_t = \text{sigm}(W_{xr}x_t + W_{hr}h_{t-1} + b_r) \quad (8)$$

In turn, the candidate activation gate lit value is provided by equation (9), where ○ denotes elementwise multiplication between the two vectors:

$$\tilde{h}_t = \tan h(W_{xh}x_t + W_{hh}(r_t \circ h_{t-1}) + b_h) \quad (9)$$

Figure 6:
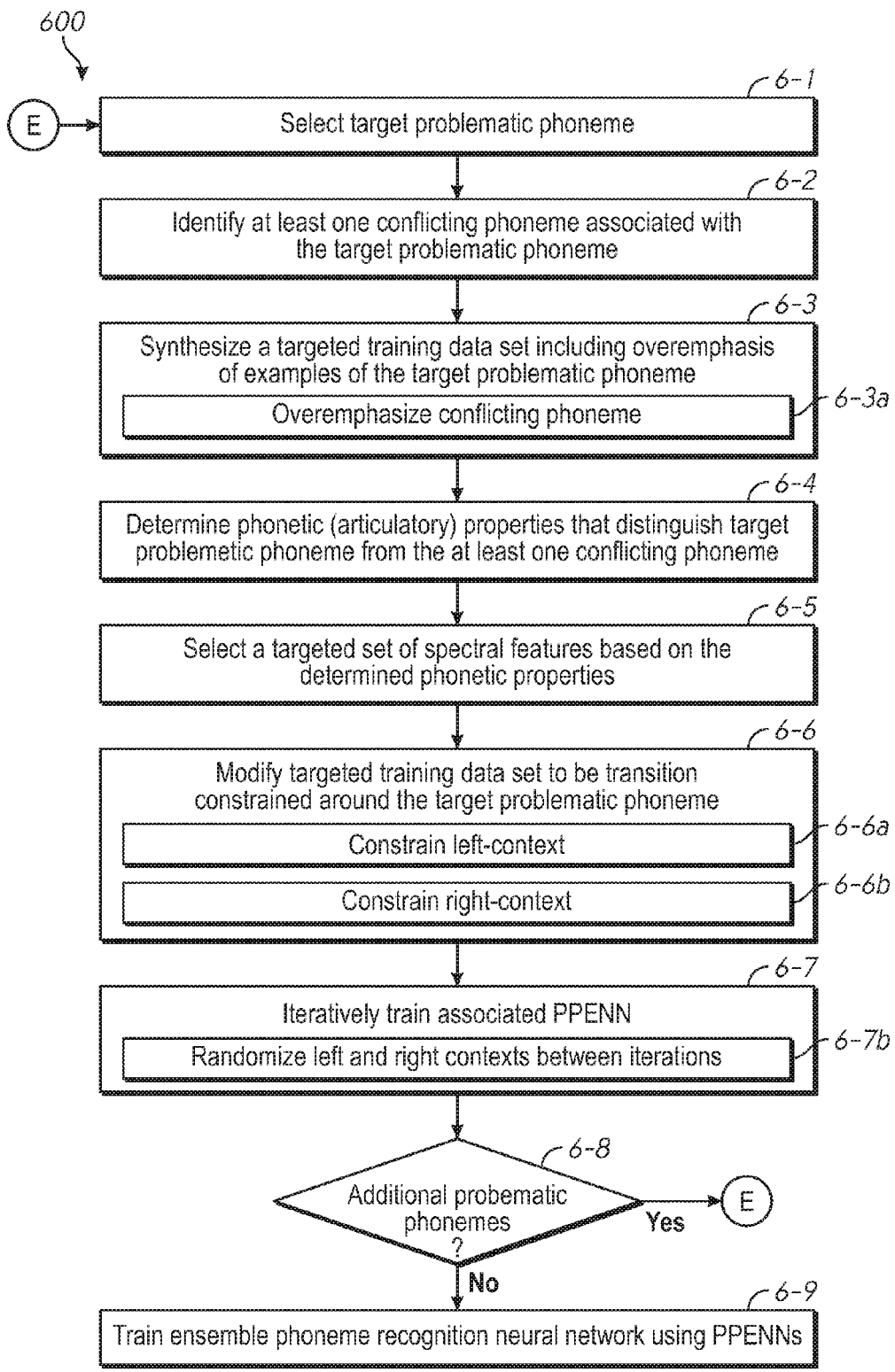
FIG. 6 is a flowchart representation of a method of training a problematic phoneme-specific expert neural network in accordance with some implementations.

FIG. 6 is a flowchart representation of a method 600 of training a problematic phoneme-specific expert neural network (again, a "PPENN") according to some implementations. Referring to FIGS. 2B and 3, in some implementations the method 600 is performed by the training module 270 and the expert-assisted phoneme recognition neural network system 300. Briefly, the method 600 includes synthesizing targeted training data for problematic phonemes, and iteratively training a collection of corresponding PPENNs, and subsequently training an ensemble phoneme recognition neural network to work in concert with the trained PPENNs.

As represented by block 6-1, the method 600 includes selecting a target problematic phoneme. A phoneme is considered problematic when it occurs rarely (e.g., below a frequency of occurrence threshold) in nominal speech patterns and/or is particularly difficult to distinguish from a similar sounding phoneme without focused attention to the spectral feature differences between the two. As represented by block 6-2, the method 600 includes identifying at least one conflicting phoneme associated with the target problematic phoneme. A conflicting phoneme is a phoneme that the target problematic phoneme is often misidentified as because the two phonemes sound similar and/or have difficult to distinguish spectral features. For example, with reference to FIG. 2B, the training set synthesizer 272 initially selects target problematic phoneme "th" and identifies phoneme "f" as a phoneme that conflicts with "th."

As represented by block 6-3, the method 600 includes synthesizing a targeted training data set including an over-emphasis of examples of the target problematic phoneme. For example, with reference to FIG. 2B, the training set synthesizer 272 draws training data from the speech corpus buffer 271, over-selects training data examples including the target problematic phoneme, and synthesizes a new randomized targeted training data set for the target problematic phoneme (e.g., "ng"). In some implementations, as represented by block 6-3a, synthesizing the targeted training data set also includes over-emphasizing examples of the at least one conflicting phoneme (e.g., "ng" vs "n"). Continuing the example, in addition to the target problematic phoneme (e.g., "ng"), the training set synthesizer 272 also over-selects training data examples other than the target (e.g., "ng") or the competitor phoneme (e.g., "n"). This might include other competitor phonemes or include instances of all of other existing phonemes in the training set. In the latter case, the proportions of all other phonemes in the training set for training a PPENN might vary between different training data synthesizing runs.

As represented by block 6-4, the method 600 includes determining phonetic properties (articulatory properties) that distinguish the target problematic phoneme and the at least one conflicting phoneme from one another. For example, with reference to FIG. 2B, the spectral features assessment and modification module 274 determines phonetic properties that distinguish the target problematic phoneme and the at least one conflicting phoneme from one another. As represented by block 6-5, the method 600 includes selecting a targeted set of spectral features based on the determined phonetic properties. In other words, spectral features that show the differences between the target problematic phoneme and the at least one conflicting phoneme are the focus of the targeted set of spectral features specifically associated with the target problematic phoneme. In turn, with reference to FIG. 3, the selected targeted set of spectral features are used to synthesize a corresponding one of the targeted feature streams ($F_2$ to $F_n$) from real-valued audible signal data during detection mode operation. As such, in various implementations, each selected targeted set of spectral features is an output of the training mode that is used in detection mode operation. More specifically, in detection mode, each PPFC sub-module is configured to synthesize a corresponding problematic phoneme feature stream that includes a selected targeted set of spectral features—the values of which are determined from real-valued audible signal data.

Returning to FIG. 6, as represented by block 6-6, in some implementations, the method 600 includes modifying the synthesized targeted training data set by constraining sequential transitions to and from training data examples of the target problematic phoneme. As represented by block 6-6a, in some implementations, constraining the synthesized targeted training data set includes constraining the left-context of training data before instances of the target problematic phoneme. Similarly, as represented by block 6-6b, constraining the synthesized targeted training data set includes constraining the right-context of training data after instances of the target problematic phoneme. As a result, by providing a PPENN with constrained left-context and constrained right-context targeted training data, the PPENN is forced to learn to focus on and recognize transitions from any preceding phoneme to the target problematic phoneme, and from the target problematic phoneme to any phoneme that follows. Moreover, limiting the left and right contexts in this way prevents the PPENN from learning to recognize sequences of phonemes—since allowing a PPENN to learn to recognize sequences would create undesirable language-specific dependencies. Learning to recognize sequences allows increases computational complexity, which is also undesirable for devices, such as hearing aids and mobile devices, which are tightly resource constrained and/or are preferred in real-time and/or low-latency applications.

Figure 7:
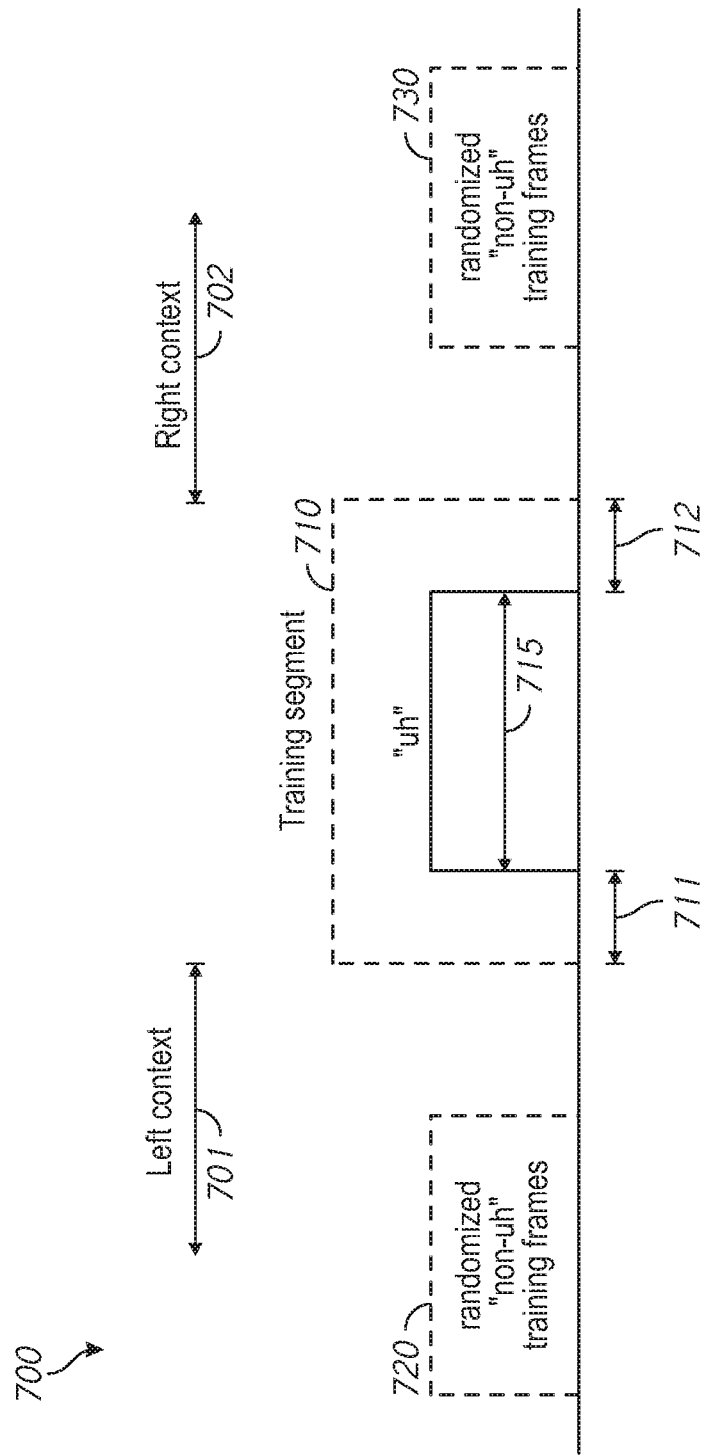
FIG. 7 is a diagram illustrating an arrangement of training data suitable for training a problematic phoneme-specific expert neural network in accordance with some implementations.

As an example of targeted training data, consider a simplified sequence of targeted training data 700, shown in FIG. 7, for training a PPENN to recognize the phoneme "uh" in accordance with some implementations. The targeted training data 700 includes a training segment 710. The training segment 710 includes a training data instance 715 of the phoneme "uh," a left-constrained portion 711 and a right-constrained portion 712.

The left-constrained portion 711 is included in the left-context 701 of the training data instance 715 of the phoneme "uh," and the right-constrained portion 712 is included in the right-context 702. In various implementations, the left-constrained portion 711 provides a transition from "non-uh" training data to "uh" training data. Similarly, right-constrained portion 712 provides a transition from "uh" training data to "non-uh" training data. In various implementations, each of the left-constrained and the right-constrained portion 712 include approximately 5 to 25 frames of "non-uh" training data. The left-context 701 and the right-context 702 also both include randomized "non-uh" training frames, although not necessarily constrained. In various implementations, each of the left-context 701 and the right-context 702 include approximately 20 to 100 frames of "non-uh" training data. Moreover, in various implementations, the left and right contexts 701, 702 include limited portions (20-50 msec) of the preceding and succeeding phonemes, thus forcing a PPENN to learn to recognize the target problematic phoneme from within arbitrary preceding and succeeding phonemes, rather than as sequences of phonemes.

Returning to FIG. 6, as represented by block 6-7, in some implementations, the method 600 includes iteratively training the associated PPENN using the targeted training data so synthesized and modified as described above. For example, with reference to FIGS. 2B and 3, the verification module 275 iteratively trains PPENN 374 by providing the targeted training data, synthesized and modified as described above, to the feature transform module 371, and determining error value convergence from the output of the PPENN 375. In some implementations, as represented by block 6-7a, iteratively training the associated PPENN includes randomizing the left and right contexts between iterations so that the PPENN will not receive repetitive input data during the training process, and thus not tend toward over-fitting or memorizing.

As represented by block 6-8, the method 600 includes determining whether or not there are additional problematic phonemes for which an associated PPENN can be trained for a particular implementation. If there are additional problematic phonemes ("Yes" path from block 6-8), the method 600 circles back to the portion of the method represented by block 6-1. On the other hand, if there are no additional problematic phonemes left to consider ("No" path from block 6-8), as represented by block 6-9, the method 600 includes training an ensemble phoneme recognition neural network to work in concert with the associated trained PPENNs. For example, with reference to FIGS. 2B and 3, the verification module 275 iteratively trains the ensemble phoneme recognition neural network 310 using the respective outputs (e.g., detection indicator values) of the PPENNS 374, 375, 376 as indicators as to when a problematic phoneme may be present in audio signal data. In various implementations, since the respective outputs of the PPENNS 374, 375, 376 are imperfect, the ensemble phoneme recognition neural network 310 may be presented with incorrect or conflicting indicators from one or more PPENNS at any moment in time, and thus learns during the training mode to apply appropriate weight to each detection indicator value during a determination of ranked candidate outputs. Based on experimental data sets, in operation, the recognition accuracy for the problematic phonemes increases significantly when the ensemble phoneme recognition neural network 310 works in concert with the phoneme-specific experts system 370. For example, in various implementations, the phoneme-specific experts system 370 raises the recognition accuracy of problematic phonemes by the ensemble phoneme recognition neural network 310 to above 30%, which is at least an order of magnitude improvement over previously available machine-listening technologies.

Figure 8:
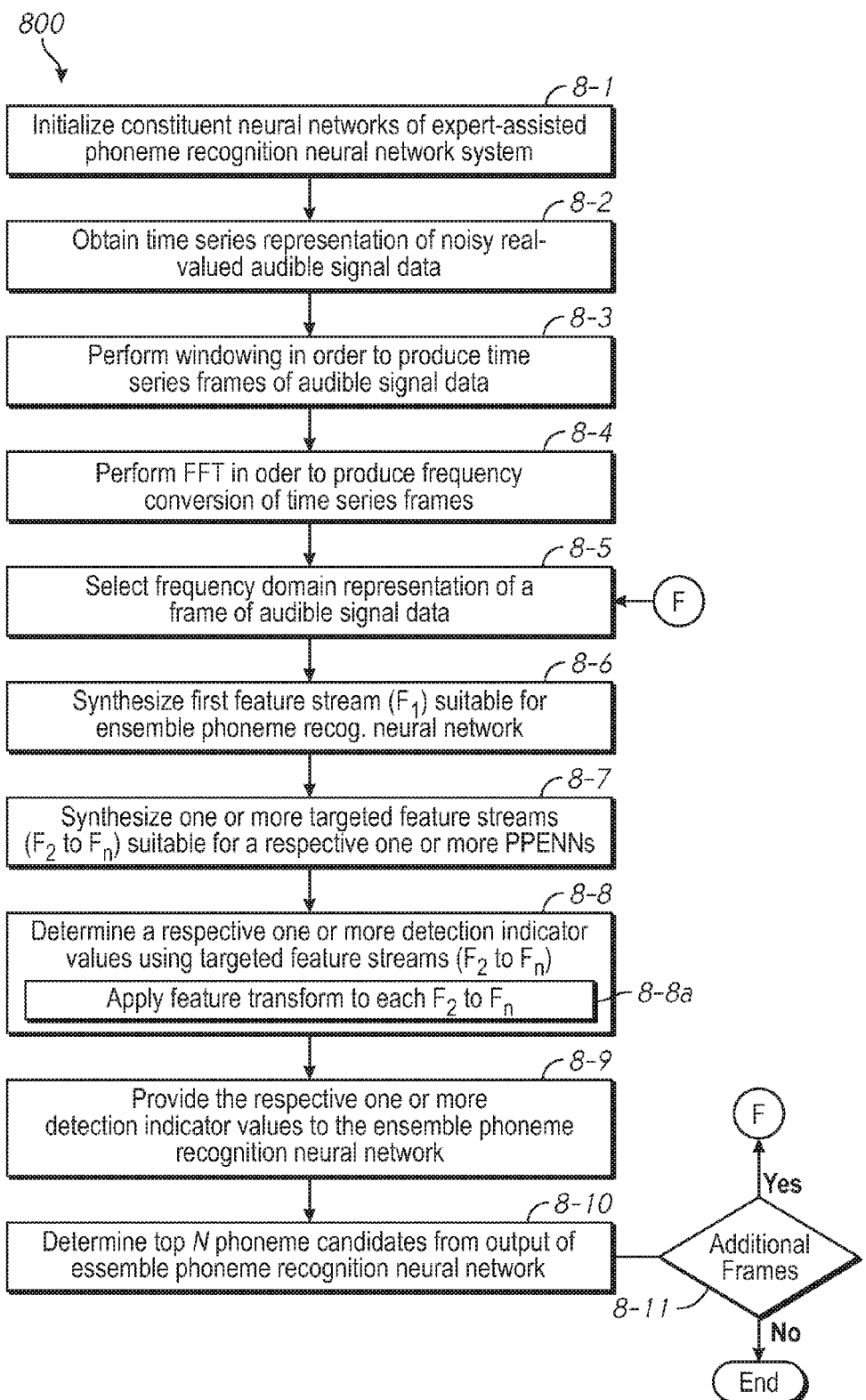
FIG. 8 is a flowchart representation of a method of identifying and re-synthesizing speech of a particular speaker in accordance with some implementations.

FIG. 8 is a flowchart representation of a method 800 of training the ensemble and associated expert networks in accordance with some implementations. Referring to FIGS. 2A and 3, in some implementations the method 800 is performed by the speech recognition and re-synthesis system 200. In some implementations, the method is primarily performed by the spectral feature characterization module 210 and the expert-assisted phoneme recognition neural network system 300. Briefly, the method 800 includes generating a plurality of feature streams ($F_1$, $F_2$ to $F_n$) from real-valued audible signal data, determining detection indicator values from targeted feature streams ($F_2$ to $F_n$) using PPENNs, and determining one or more most likely phoneme candidates based on the first feature stream ($F_1$) and the detection indicator values using an ensemble phoneme recognition neural network.

As represented by block 8-1, the method 800 includes initializing each of constituent neural networks of an expert-assisted phoneme recognition neural network system with weights generated during a training mode. For example, with reference to FIGS. 2B and 3, the training module 270 provides respective sets of weights to the ensemble phoneme recognition neural network 310 and the first, second, and third PPENNs 374, 375, 376 of the phoneme-specific experts system 370. As represented by block 8-2, the method 800 includes receiving a time series representation of noisy real-valued audible signal data. For example, with reference to FIG. 2A, the microphone 201 receives and converts an audible signal into an electronic signal that can be stored in a non-transitory memory. As represented by block 8-3, the method 800 includes performing a windowing operation in order to produce time series frames of the audible signal data generated by the microphone 201. For example, with reference to FIG. 2A, the times series conversion module 203 is configured to mark and separate one or more temporal frames or portions of the audible signal data for times $t_1$, $t_2, \ldots, t_n$. As represented by block 8-4, the method 800 includes performing an FFT in order to produce a frequency domain conversion of the time series frames. For example, with reference to FIG. 2A, the spectrum conversion module 204 operates to generate a corresponding frequency domain representation for each of the one or more temporal frames of audible signal data. The frequency domain representations generated are for the frames of the audible signal data subsequently stored in the frame buffer 205.

As represented by block 8-5, the method 800 includes selecting a frequency domain representation of a temporal frame of the audible signal data. As represented by block 8-6, the method 800 includes synthesizing a first feature stream ($F_1$) for an ensemble phoneme recognition neural network. For example, with reference to FIG. 3, the ensemble feature characterization sub-module 231 synthesizes the first feature stream ($F_1$) for use by the ensemble phoneme recognition neural network 310 using the selected frequency domain representation of the audible signal data frame. As represented by block 8-7, the method 800 includes synthesizing one or more targeted feature streams ($F_2$ to $F_n$) suitable for a corresponding one or more PPENNs. For example, with reference to FIG. 3, the first, second and third PPFCs 232, 233, 234 respectively synthesize corresponding second, third and fourth feature streams ($F_2$, $F_3$, $F_4$) for the first, second and third PPENNs 374, 375, 376.

As represented by block 8-8, the method 800 includes determining a respective one or more detection indicator values from the one or more targeted feature streams ($F_2$ to $F_n$) using a corresponding one or more PPENNs. For example, with reference to FIG. 3, the first, second and third PPENNs 374, 375, 376 determine corresponding detection indicator values that are in turn provided to the second hidden layer 340, as described above. In some implementations, as represented by block 8-8a, determining the respective one or more detection indicator values includes applying a respective feature transform to each of the one or more targeted feature streams ($F_2$ to $F_n$) prior to processing by a corresponding PPENN. For example, with reference to FIG. 3, the first, second, and third feature transform modules 371, 372, 372 each apply a linear discriminant analysis transform to a corresponding one of the second, third and fourth feature streams ($F_2$, $F_3$, $F_4$).

As represented by block 8-9, the method 800 includes providing the one or more detection indicator values to the ensemble phoneme recognition neural network. For example, with reference to FIG. 3, the respective outputs of the first, second, and third logic units 381, 382, 383 are coupled to the LSTM logic units 341 included in the second hidden layer 340. As represented by block 8-10, the method 800 includes determining the top N phoneme candidates from the outputs of the ensemble phoneme recognition neural network. For example, with reference to FIG. 3, in various implementations, the phoneme candidate selection module 360 is configured to select the top N phoneme candidates based on the corresponding values provided at the outputs 353. In some implementations, the top N phoneme candidates are the most likely phonemes present in a given frame. In some implementations, the phoneme candidate selection module 360 selects a single most likely phoneme for a frame based on the corresponding values provided at the outputs 353. As represented by block 8-11, the method 800 includes determining whether or not additional frames of audible signal data remain within a frame buffer. If additional frames are present in the frame buffer ("Yes" path from block 8-11), the method circles back to the portion of the method represented by block 8-5. On the other hand, if one or more additional frames are not present in the frame buffer ("No" path from block 8-11), the method ends.

Figure 9:
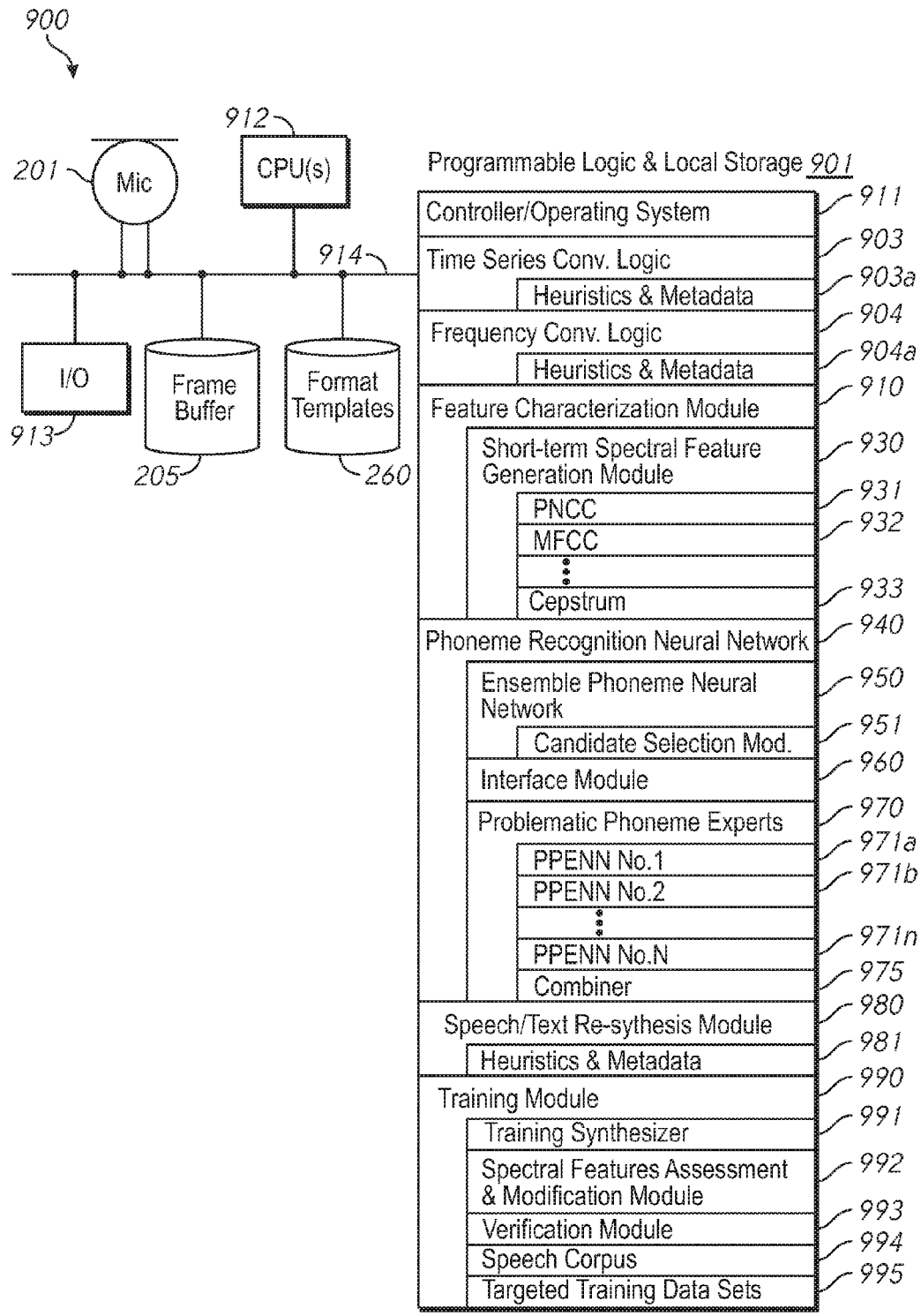
FIG. 9 is a schematic diagram of a system configured to identify and re-synthesize the speech of a particular speaker according to some implementations.

FIG. 9 is a schematic diagram of a system 900 configured to identify and re-synthesize speech of a particular speaker in accordance with some implementations. The system 900 illustrated in FIG. 9 is similar to and adapted from the speech recognition and re-synthesis system 200 illustrated in FIG. 2. Elements common to each include common reference numbers, and only the differences between FIGS. 2 and 9 are described herein for the sake of brevity. Moreover, while pertinent features are illustrated, those skilled in the art will appreciate from the present disclosure that various other features have not been illustrated for the sake of brevity and so as not to obscure more pertinent aspects of the example implementations disclosed herein.

As a non-limiting example, in some implementations the system 900 includes the microphone 201, the frame buffer 205, the formant templates buffer 260, one or more processing units (CPU's) 912, one or more local I/O (input/output) interfaces 913, an allocation of programmable logic and/or non-transitory memory (local storage) 901, and one or more communication buses 914 for interconnecting these and various other components not illustrated for the sake of brevity.

In some implementations, the communication buses 914 include circuitry that interconnects and controls communications between the various components of the system 900. In various implementations the programmable logic and/or non-transitory memory 901 includes a suitable combination of a programmable gate array (such as an FPGA or the like), high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The programmable logic and/or non-transitory memory 901 optionally includes one or more storage devices remotely located from the CPU(s) 912. The programmable logic and/or non-transitory memory 901 comprises a non-transitory computer readable storage medium. In some implementations, the programmable logic and/or non-transitory memory 901 includes the following programs, modules and data structures, or a subset thereof including a programmable logic controller (and/or an optional operating system) 911, time series conversion logic 903, frequency domain conversion logic 904, a feature characterization module 910, a phoneme recognition neural network 940, a speech (or text) re-synthesis module 980, and a training module 990.

The programmable logic controller 911 includes implementations of functions and procedures for handling various system services and for performing hardware dependent tasks. In some implementations, the programmable logic controller 911 includes some or all of an operating system executed by the CPU(s) 912.

In some implementations, the times series conversion module 903 is configured to generate two or more temporal frames of audible signal data from a continuous stream of audible signal data. Each temporal frame of audible signal data includes a temporal portion of the audible signal received by the microphone 201. In some implementations, the times series conversion module 903 includes a windowing module that is configured to mark and separate one or more temporal frames or portions of the audible signal data for times $t_2, \ldots, t_n$. To that end, the times series conversion module 903 includes heuristics and metadata 903a.

In some implementations, the frequency domain conversion logic 904 is configured to generate a corresponding frequency domain representation for each of the one or more temporal frames, so that one or more spectral characteristics of the audible signal data can be determined for each frame. In some implementations, the frequency domain representation of a temporal frame includes at least one of a plurality of sub-bands contiguously distributed throughout the frequency spectrum associated with voiced sound. To that end, the frequency domain conversion logic 904 includes heuristics and metadata 904a. In some implementations, for example, the frequency domain conversion logic 904 includes a Fast Fourier Transform (FFT) sub-module. The frequency domain representations of the frames are stored in the frame buffer 205, which is accessible to the spectral feature characterization module 910.

In some implementations, the feature characterization module 910 is configured to generate a plurality of feature streams from frequency domain representations of the one or more frames of audible signal data. In various implementations, the plurality of feature streams generated by the feature characterization module 910 includes a first feature stream ($F_1$) that is suitable for an ensemble phoneme recognition neural network. Additionally, in some implementations, the plurality of feature streams generated includes one or more targeted feature streams ($F_2$ to $F_n$) that are suitable for corresponding PPENNs. As described above, each problematic phoneme feature stream is provided to a corresponding PPENN that supports the operation of the ensemble phoneme recognition neural network.

In various implementations, the feature characterization module 910 includes a short-term spectral feature generation module 930. In various implementations, the short-term spectral feature generation module 930 is configured to synthesize the plurality of feature streams ($F_1$, $F_2$ to $F_n$). Each of the plurality of feature streams ($F_1$, $F_2$ to $F_n$) includes any of a number and/or combination of signal processing features, such as spectra, cepstra, mel-scaled cepstra coefficients, power normalized cepstral coefficients, fundamental frequency ($f_0$), a signal-to-noise ratio (SNR), a voice strength estimate, and a voice period variance estimate. For example, in some implementations, the short-term spectral feature generation module 930 includes a power normalized cepstral coefficients analysis sub-module 931, a mel-frequency cepstrum coefficients analysis sub-module 932, and a cepstrum analysis sub-module 933.

In some implementations, the phoneme recognition neural network 940 is configured to recognize individual phonemes with respect to all other phonemes within audible signal data. To that end, the phoneme recognition neural network 940 includes an ensemble phoneme recognition neural network 950, an interface module 960, and a number of problematic phoneme experts 970. The ensemble phoneme recognition neural network 950 is configured to recognize individual phonemes with respect to all other phonemes in a sequence of audible signal data. The ensemble phoneme recognition neural network 950 uses the spectral features included in the first feature stream ($F_1$) that was synthesized from the sequence of audible signal data obtained by the microphone 201. As noted above, for the majority of phonemes, the ensemble phoneme recognition neural network 950 performs with a relatively high level of accuracy without support from the problematic phoneme experts system 970. In some implementations, the ensemble phoneme recognition neural network 950 includes a phoneme candidate selection module 951. In various implementations, the phoneme candidate selection module 951 is configured to select the top N phoneme candidates produced by the ensemble phoneme recognition neural network 950.

The interface module 960 includes a number of logic units configured to provide a gating function between the problematic phoneme experts 970 and the ensemble phoneme recognition neural network 950. As shown in FIG. 9, the problematic phoneme experts 970 includes a number of PPENNs 971a, 971b, . . . , 971n, and a combiner 975. As described above with reference to FIG. 4, the combiner 975 is configured to combine respective detection indicator values provided by PPENNs for non-conflicting problematic phonemes into a single detection indicator value for use by the ensemble phoneme recognition neural network 950.

In some implementations, the speech (or text) re-synthesis module 980 is configured to use the output of the ensemble phoneme recognition neural network 950 in combination with formant templates (stored in buffer 260) in order to re-synthesize an audible speech signal (or a text translation) of the audible signal data received by the microphone 201.

In some implementations, the training module 990 is configured to train the various portions of the phoneme recognition neural network 940. As shown in FIG. 9, in various implementations, the training module 990 includes a training set synthesizer 991, a spectral features assessment and modification module 992, a verification module 993, a speech corpus buffer 994, and a targeted training data buffer 995.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first feature could be termed a second feature, and, similarly, a second feature could be termed a first feature, which changing the meaning of the description, so long as all occurrences of the "first feature" are renamed consistently and all occurrences of the "second feature" are renamed consistently. The first feature and the second feature are both features, but they are not the same feature.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method of training an expert-assisted phoneme recognition neural network system, the method comprising:
at an expert-assisted phoneme recognition neural network system configured to generate one or more phoneme candidates as recognized within audible signal data, the expert-assisted phoneme recognition neural network system including an ensemble phoneme recognition neural network and a phoneme-specific experts system:
selecting a target problematic phoneme;

synthesizing a targeted training data set including an overemphasis of examples of the target problematic phoneme;

synthesizing respective problematic phoneme-specific weight values for a problematic phoneme-specific expert neural network (PPENN) included in the phoneme-specific experts system, in accordance with a determination that the respective problematic phoneme-specific weight values satisfy an error convergence threshold, by:

providing the synthesized target training data set to the PPENN;

determining an output of the PPENN in response to providing the synthesized target training data set to the PPENN;

updating the respective problematic phoneme-specific weight values for the PPENN based on a function of the output of the PPENN; and iteratively providing the synthesized target training data to the PPENN and updating the respective problematic phoneme-specific weight values until a set of updated weights satisfies the error convergence threshold.

2. The method of claim 1, wherein synthesizing a targeted training data set comprises:

obtaining training data from a speech corpus;

over-selecting training data examples including the target problematic phoneme; and synthesizing a randomized targeted training data set for the target problematic phoneme using the selections from the speech corpus.

3. The method of claim 2, wherein synthesizing a targeted training data set comprises over-selecting training data examples including at least one conflicting phoneme associated with the target problematic phoneme.

4. The method of claim 1, wherein the function of the output of the PPENN includes a partial derivative function of the output of the PPENN.

5. The method of claim 1, further comprising determining a targeted set of spectral features based on phonetic properties that distinguish the target problematic phoneme from other phonemes.

6. The method of claim 5, further comprising providing the targeted set of spectral features to a problematic phoneme feature characterization (PPFC) sub-module, wherein the PPFC sub-module is configured to synthesize and provide a corresponding targeted feature stream to the phoneme-specific experts system.

7. The method of claim 5, wherein the targeted set of spectral features includes one or more of spectra values, cepstra values, mel-scaled cepstra coefficients, power normalized cepstral coefficients, a pitch value, a signal-to-noise ratio (SNR), a voice strength estimate, and a voice period variance estimate.

8. The method of claim 1, further comprising determining phonetic properties that distinguish the target problematic phoneme and a conflicting phoneme from one another using the targeted training data.

9. The method of claim 8, further comprising modifying the synthesized targeted training data set by constraining sequential transitions to or from training data examples of the target problematic phoneme based on the determined phonetic properties, and wherein synthesizing respective problematic phoneme-specific weight values utilizes the modified synthesized targeted training data set.

10. The method of claim 9, wherein constraining the synthesized targeted training data set includes constraining the left-context of training data before instances of the target problematic phoneme.

11. The method of claim 9, wherein constraining the synthesized targeted training data set includes constraining the right-context of training data after instances of the target problematic phoneme.

12. The method of claim 1, further comprising synthesizing respective ensemble weight values for the ensemble phoneme recognition neural network by training the ensemble phoneme recognition neural network in combination with the problematic phoneme-specific expert neural network (PPENN) included in the phoneme-specific experts system.

13. The method of claim 12, wherein training the ensemble phoneme recognition neural network includes synthesizing a first feature stream from training data, wherein the first feature stream includes a combination of spectral features enabling identification of each of a majority of a plurality of phonemes as distinct from the majority of the plurality of phonemes.

14. The method of claim 12, wherein training the ensemble phoneme recognition neural network includes synthesizing a targeted feature stream from training data, wherein the targeted feature stream includes spectral values that distinguish the target problematic phoneme from other phonemes.

15. The method of claim 14, wherein synthesizing the targeted feature stream includes applying a transform to the targeted features stream in order to emphasize spectral differences between the target problematic phoneme and at least one conflicting phoneme.

* * * * *